(12) United States Patent
Yoshihara et al.

(10) Patent No.: US 9,778,986 B2
(45) Date of Patent: Oct. 3, 2017

(54) STORAGE SYSTEM

(71) Applicant: Hitachi, Ltd., Tokyo (JP)

(72) Inventors: Tomohiro Yoshihara, Tokyo (JP); Akira Yamamoto, Tokyo (JP); Shigeo Homma, Tokyo (JP); Junji Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 297 days.

(21) Appl. No.: 14/426,716

(22) PCT Filed: Mar. 28, 2014

(86) PCT No.: PCT/JP2014/059128
§ 371 (c)(1),
(2) Date: Mar. 6, 2015

(87) PCT Pub. No.: WO2015/145724
PCT Pub. Date: Oct. 1, 2015

(65) Prior Publication Data
US 2016/0259687 A1    Sep. 8, 2016

(51) Int. Cl.
*G11C 29/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0688* (2013.01); *G06F 3/0689* (2013.01)

(58) Field of Classification Search
CPC ............................ G06F 11/10; G06F 11/1068; G06F 11/1076; G06F 11/1072; G06F 3/0688; G06F 3/0619; G06F 3/064
See application file for complete search history.

(56) References Cited

U.S. PATENT DOCUMENTS 6,446,237 B1 *  9/2002  Menon ................ G06F 11/1076
                                                          714/6.11
9,098,445 B2 *  8/2015  Meir ........................ G06F 11/10
(Continued)

FOREIGN PATENT DOCUMENTS

JP           09-282238 A      10/1997
JP           10-111762 A       4/1998
(Continued)

OTHER PUBLICATIONS

International Search Report & Written Opinion in PCT/JP2014/059128 dated Apr. 22, 2014.
(Continued)

*Primary Examiner* — Shelly A Chase
(74) *Attorney, Agent, or Firm* — Foley & Lardner LLP

(57) ABSTRACT

The storage system according to the present invention comprises a controller, and multiple storage device constituting a RAID group. When storing write data to multiple discontinuous areas within stripes of a storage device, the storage system transmits a new data transmission command containing information for specifying the multiple discontinuous areas and a write data to the storage device, and thereafter, receives an intermediate parity generated from multiple write data and data before update of the multiple write data from the storage device, and then transmits the received intermediate parity and an intermediate parity transmission command to the storage device storing the parity. Thereafter, a data commitment command containing information for specifying multiple discontinuous areas is transmitted to multiple storage devices, and the storage device storing the parity generates a parity after update from the received intermediate parity and a parity before update corresponding to the intermediate parity, and stores the parity after update in a storage media.

11 Claims, 27 Drawing Sheets

(56) References Cited

U.S. PATENT DOCUMENTS

| 9,311,182 B2* | 4/2016 | Bennett ............... G06F 11/1068 |
| 2003/0105922 A1 | 6/2003 | Tomita |
| 2013/0290773 A1 | 10/2013 | Yoshihara |
| 2014/0059294 A1 | 2/2014 | Naruse |

FOREIGN PATENT DOCUMENTS

| JP | 2003-167689 A | 6/2003 |
| JP | 2014-041471 | 3/2014 |

OTHER PUBLICATIONS

PCT International Search Report and Written Opinion of the International Searching Authority on application PCT/JP2014/059128 mailed Apr. 22, 2014; 8 pages.

\* cited by examiner

Fig. 3

| LOGICAL VOLUME ID (LUN) | FMPK ID | RAID LEVEL | XOR ENABLE |
|---|---|---|---|
| 0 | 0, 1, 2, 3 | 5(3D+1) | 1 |
| 1 | 4, 5, 6, 7 | 5(7D+1P) | 0 |
| ... | ... | ... | ... |

STORAGE SYSTEM

The present invention relates to an art of generating redundant data in storage systems.

BACKGROUND ART

In storage systems, in order to enhance availability, it is common to adopt a configuration where multiple storage media are installed in the system, and when write data received from a superior device such as a host computer is stored in the storage media, redundant data such as parity is computed based on the write data, and the write data and the parity are stored in different storage media. Normally, parity computation is executed by a controller (storage controller) in the storage system, but since the processing load of the storage controller is increased thereby, a technique can be adopted where a storage media is equipped with the function to calculate parity, so that the parity computation load is off-loaded from the storage controller to the storage media side.

For example, Patent Literature 1 discloses a storage system having multiple storage media and a storage controller for controlling the multiple storage media, wherein the storage media is equipped with a parity generating function. According to the storage system, when a write request of update data is received from the host computer, the storage controller transmits the update data to the storage media storing the data before update of the relevant update data. Next, the storage controller lets the storage media generate an intermediate parity from the update data and the data before update, and receives the intermediate parity generated by the storage media. Then, the received intermediate parity is transmitted to the storage media storing the parity corresponding to the update data. Finally, a data commitment command is transmitted to the respective storage media, by which the stored content of the storage media storing the data before update is committed to a state where the update data is stored therein, and in the storage media storing the parity, a parity after update is generated and stored based on the intermediate parity and the parity before update having been stored in the storage media.

Patent Literature 1 US Patent Application Publication No. 2013/0290773

Technical Problem

Normally, a storage position information of access target data is contained in an access command (such as a write command) for instructing a write request or the like to a storage media from the storage controller. In many cases, an initial address of the area storing the access target data and a data length of the access target data are used as position information. That is, many storage media or storage devices adopt a specification assuming that write target data is written in continuous areas starting from the designated address.

On the other hand, with the aim to improve the response performance, many storage systems adopt a method where a given quantity of write data received from the host computer is accumulated in a cache memory, and later, the data accumulated in the cache memory is collectively stored into the storage media. At this time, if multiple data arriving from the host computer is to be stored into continuous areas in the storage media, when writing the multiple data accumulated in the cache memory to the storage media, the multiple data can be stored by issuing a single command to the storage media, and the processing efficiency can be improved.

Actually, however, since the data arriving from the host computer are often stored into discontinuous areas in the storage media (so-called write data based on random writes), when multiple data accumulated in the cache memory are written in the storage media, it is necessary to issue a command per each data write, so the processing efficiency cannot be improved. Based on the art disclosed in Patent Literature 1, the load of the parity generation process can be off-loaded to the storage media, but when a large amount of data stored in non-successive areas in the storage media exist in a cache memory, the storage controller must issue many commands to the storage media, and the load applied on the storage controller becomes too heavy.

SUMMARY Of INVENTION

A storage system according to one embodiment of the present invention has a controller, and multiple storage devices constituting a RAID group. The respective storage devices constituting a RAID group has a function to process commands having designated the multiple discontinuous areas of the storage device. When the controller stores write data corresponding to multiple discontinuous areas in the storage device, the controller transmits a new data transmission command designating the multiple discontinuous areas and a write data to the storage device, and thereafter, transmits an intermediate parity reception command to the storage device. The storage device having received the intermediate parity reception command generates an intermediate parity based on the already received write data and the data before update of the write data, and sends the same to the controller. The controller transmits the intermediate parity transmission command and the received intermediate parity to the storage device storing the parity.

Thereafter, when the controller transmits a data commitment command designating multiple discontinuous areas to the storage device, the storage device storing the parity generates a parity after update based on the received intermediate parity and the parity before update corresponding to the intermediate parity, and stores the parity after update in the storage media.

According to the present invention, it becomes possible to reduce the process load applied on the storage controller regarding parity generation and data storage process to the storage media, especially contributing to improving the random write performance.

BRIEF DESCRIPTION OF DRAWINGS

FIG. 3 illustrates a configuration of a volume management table.

DESCRIPTION OF EMBODIMENTS

Now, a storage system according to a preferred embodiment of the present invention will be described with reference to the drawings. The present invention is not restricted to the embodiment described hereafter.

Figure 1:
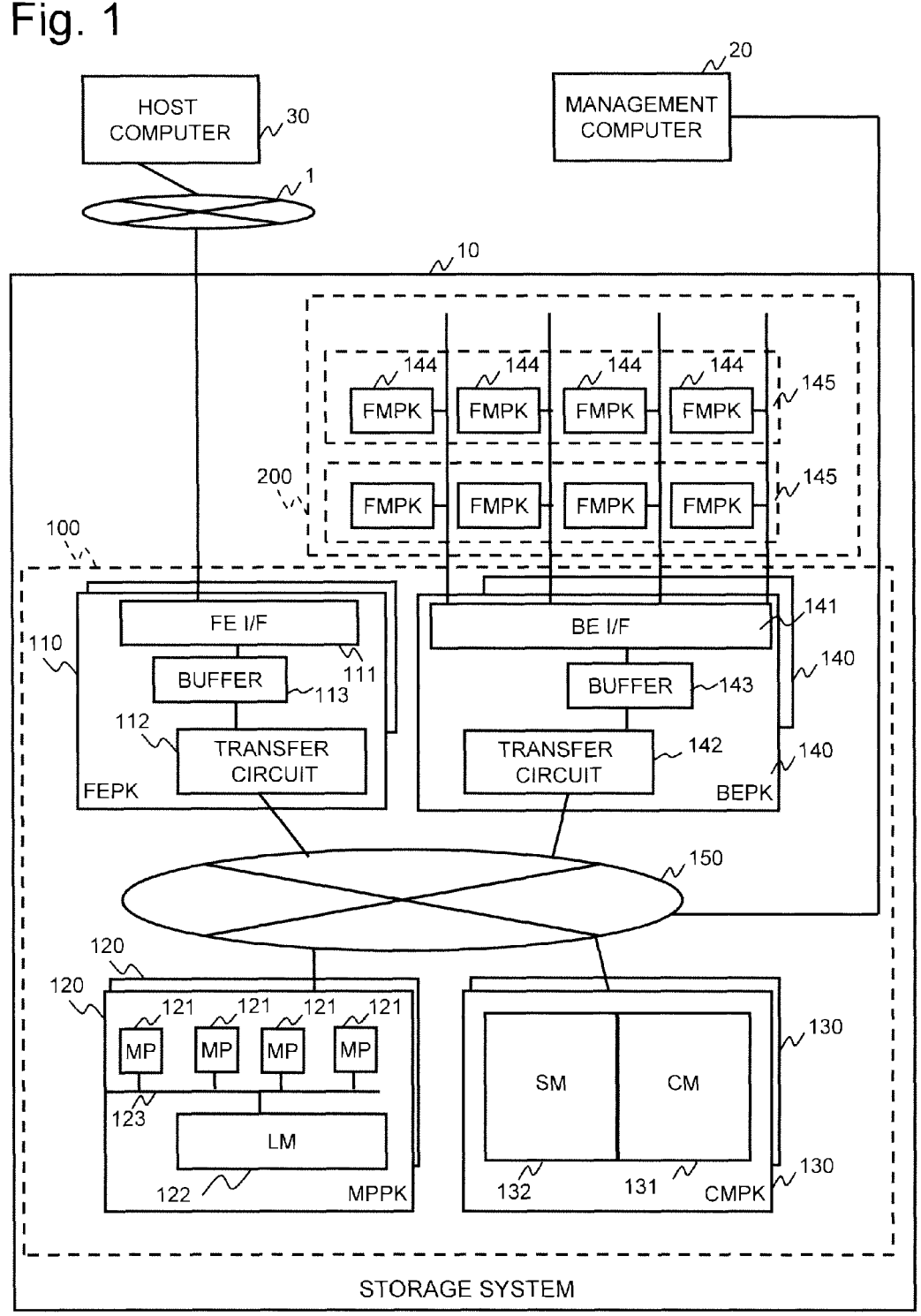
FIG. 1 illustrates a configuration example of a storage system according to a preferred embodiment of the present invention.

FIG. 1 illustrates a configuration of a storage system 10 according to one preferred embodiment of the present invention. The storage system 10 has a controller 100, and a storage unit 200 connected to the controller.

The storage unit 200 has multiple final storage devices for storing write data from a host computer or other superior devices. According to the storage system 10 of a preferred embodiment of the present invention, one or more FMPKs (Flash Memory Packages) 144 are used as the final storage devices. FMPKs are storage media using nonvolatile semiconductor memories such as flash memories, one example of which is an SSD (Solid State Drive). The controller 100 manages multiple FMPKs as one or multiple RAID (Redundant Arrays of Inexpensive Disks) groups 145. According to the storage system 10 of the present embodiment, the respective FMPKs 144 included in a single RAID group 145 are connected via different paths to the BEPK 140. This is to enable access to other FMPKs 144 constituting the RAID group even when failure occurs to one path. However, it is possible to form the RAID group from multiple FMPKs connected to the same path.

The controller 100 has one or more host computers 30, and a management computer 20 connected thereto. The controller 100 and the host computer 30 are connected via a SAN (Storage Area Network) 1 formed using Fibre Channel, for example. The controller 100 and the management computer 20 are connected via a network 150 formed using Ethernet, for example.

The controller 100 is composed of at least a FEPK (FrontEnd PacKage) 110, an MPPK (MicroProcessor PacKage) 120, a CMPK (Cache Memory PacKage) 130, and a BEPK (BackEnd PacKage) 140. The FEPK 110, the MPPK 120, the CMPK 130 and the BEPK 140 are all implemented as package boards, and in the present specification, they are collectively referred to as "package board". Each type of the package boards are multiplexed in the controller 110 so as to ensure high performance and high availability. However, the present invention is also effective in a configuration where only one package board is in the controller regarding at least one type of package board out of these multiple types of package boards. The FEPK 110, the MPPK 120, the CMPK 130 and the BEPK 140 are mutually connected via the network 150.

The FEPK 110 has one or more FE I/Fs (FrontEnd I/Fs) 111 which are interface units for communicating with the host computer 30, a transfer circuit 112, and a buffer 113. For example, the FE I/F 111 receives an I/O request (such as a read request or a write request) from the host computer 30, stores the received I/O request temporarily in the buffer 113, and transfers the same to the MPPK 120 via the transfer circuit 112. The buffer 113 is composed, for example, of a volatile semiconductor memory, but it can be composed of a nonvolatile memory.

The BEPK 140 has one or more BE I/Fs (BackEnd I/Fs) 141 which is an interface unit for communicating with the FMPKs 144, a transfer circuit 142, and a buffer 143. The BE I/F 141 reads data from the FMPK 144, for example, and temporarily stores the read data in the buffer 143. The transfer circuit 142 transmits the data stored in the buffer 143 to the CMPK 130. On the other hand, the transfer circuit 142 also writes the data read from the CMPK 130 to the buffer 143, and sends the data written in the buffer 143 via the BE I/F 14 to the FMPK 144. The buffer 143 is composed of a volatile semiconductor memory, for example, but it can also be composed of a nonvolatile memory. The BE I/F 141 adopts an interface in compliance with FC (Fibre Channel), SAS (Serial Attached SCSI) or SATA (Serial ATA) standards.

The CMPK 130 has a CM (Cache Memory) 131 which is a storage area for temporarily storing the I/O target data of the storage media, and an SM (Shared Memory) 132 which is an area for storing various management information and the like of the storage system 10. The CM 131 and the SM 132 are composed of volatile storage media such as DRAMs and SRAMs, but it can also be composed of nonvolatile memories.

The MPPK 120 has one or more microprocessors (referred to as "MP" in the drawing) 121, and an LM (Local Memory) 122 connected to the MP 121 via an internal bus 123. The MP 121 processes the I/O requests arriving from the FE I/F 111. The LM 122 is used to store necessary portions of the management information stored in the SM 132. It is also used to store programs executed by the MP 121. The storage system 10 of the present embodiment is capable of controlling the transfer of data between package boards, and the storing and deleting of data in the buffer 113 of the FEPK 110, the buffer 143 of the BEPK 140, the CM 131 and the SM 132. It is also possible to adopt a configuration where a battery is loaded in the system in case power supply to the storage system 10 is stopped by power failure or the like, and when power supply to the storage system 10 is disrupted, power is supplied from the battery to retain the contents stored in the CMPK 130.

The management computer 20 is a computer equipped with input and output devices such as a CRT and a keyboard. The management computer 20 transmits commands for performing various settings to the storage system 10, for example, by the operation of an administrator.

Figure 2:
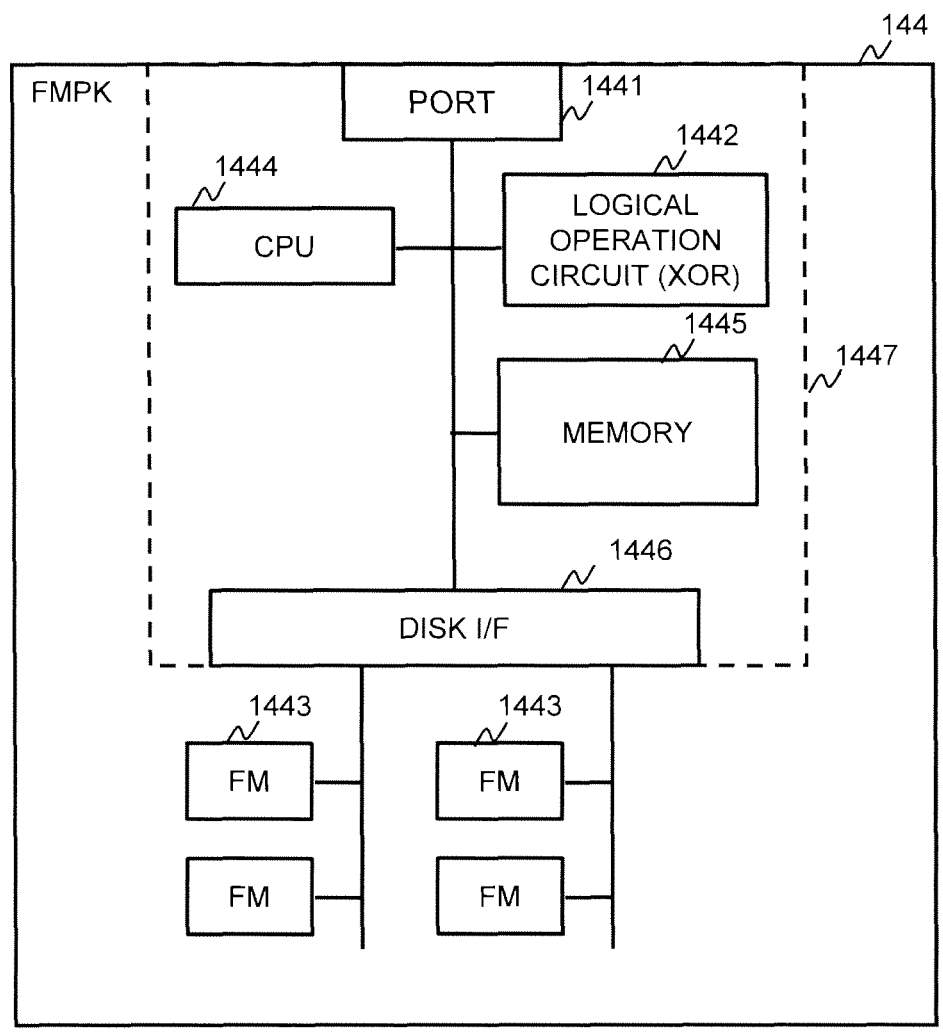
FIG. 2 illustrates a configuration diagram of FMPK.

The configuration of the FMPK 144 will be described with reference to FIG. 2. The FMPK 144 has an FM controller 1447 and multiple FMs 1443. The FM controller 1447 is equipped with a port 1441, a logical operation circuit (sometimes referred to as XOR in the drawing) 1442, a CPU 1444, a memory 1445, and a disk interface (referred to as "Disk I/F" in the drawing) 1446.

The FM 1443 is a nonvolatile semiconductor memory chip, which is a NAND type flash memory. In a flash memory, as well known, data is read and written in page units, and data is erased in block units, which is a set of multiple pages. A once-written page cannot be overwritten, and in order to write data again to a page to which data is already written, it is necessary to erase the whole block including that page. Therefore, the FMPK 144 is not provide a storage area included in the FM 1443 as it is to the MPPK 120 to which the FMPK 144 is connected, but instead, provides logical storage spaces. A logical storage space is composed of areas divided into given sizes called logical pages, wherein when the FMPK 144 receives a data write request to a logical page from (the MP 121 of) the MPPK 120, data is stored by allocating a physical storage area (physical page) included in the FM 1443 to the logical page. Further, when a data write request (or overwrite) to the same logical page is received, a different physical page is allocated to the relevant logical page, and data stored in that different physical page. The physical page in which the data before overwrite is stored is determined as an invalid page, and later, the page will be subjected to an erase process by a reclamation process.

The memory 1445 stores a table for managing the mapping between a logical page and a physical page. A volatile memory is used as the memory 1445. However, a nonvolatile memory can also be used as the memory 1445.

Next, we will describe the relationship between a logical volume and a RAID group, each of which is configured by a storage system 10 according to the preferred embodiment of the present invention. The storage system 10 forms a RAID (Redundant Arrays of Inexpensive/Independent Disks) group from multiple (such as four) FMPKs 144, and when a failure occurs to one FMPK 144 and data cannot be accessed, the data in the remaining FMPKs 144 can be used to recover the data stored in the FMPK 144 in which failure has occurred. Further, the storage area of the RAID group is provided as a logical volume to a superior device such as the host computer 30.

The controller 100 manages the mapping of the FMPK 144 associated with each logical volume using a volume management table 300 illustrated in FIG. 3. This information is stored in the SM 132. A logical volume ID (301) which is an identification number of a logical volume defined in the storage system 10, an FMPK ID (302) which is an identification number of the FMPK 144 constituting the RAID group mapped to the logical volume, a RAID level of the RAID group (303), and an XOR Enable bit (304) are managed in the volume management table 300. According to the storage system 10 of the present embodiment, a configuration is adopted where a storage area of one RAID group is mapped to one logical volume. The XOR Enable bit (304) will be described later.

Figure 4:
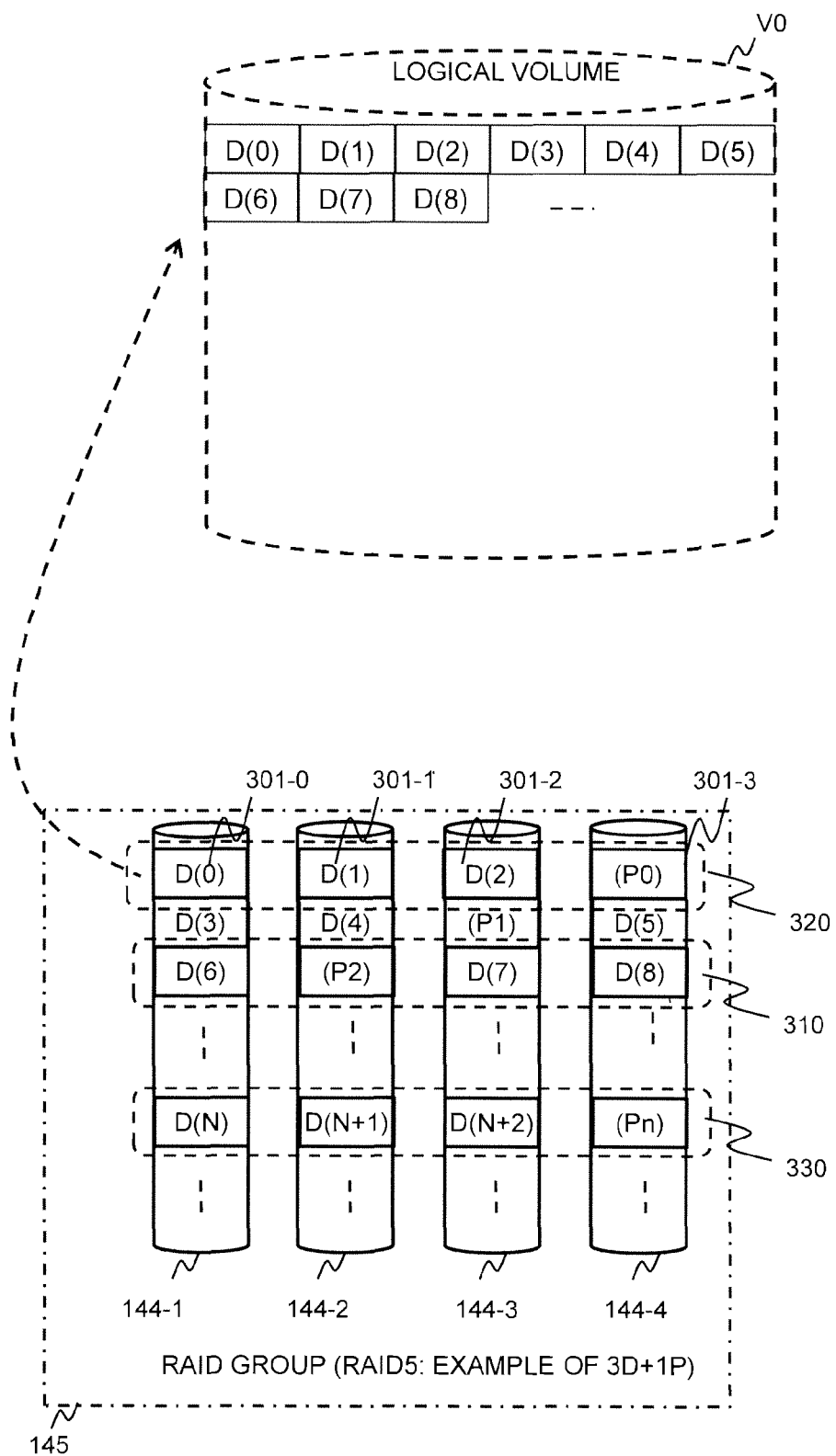
FIG. 4 is a conceptual diagram showing the relationship between a storage space in a logical volume and a storage area within a RAID group.

The relationship between the storage space in the logical volume and the storage area within the RAID group will be described with reference to FIG. 4. The controller 100 divides the storage space in the logical volume (V0 in the drawing) into multiple fixed-sized storage areas called stripes, and maps the same to the storage areas of the RAID group 145. In FIG. 4, boxes such as D(0) and D(1) within the logical volume V0 show stripes, and the size of each stripe can be 64 KB, 256 KB or 512 KB, for example. The number in the bracket, such as (1), assigned to each stripe (such as D(0), D(1) and so on) is called a "stripe number".

In FIG. 4, elements 144-1 through 144-4 represent storage spaces provided by the FMPK 144 to the controller 100. The group of stripes in the logical volume V0 is not continuously mapped to the storage spaces of only a single specific FMPK 144. Each stripe is mapped in a dispersed manner to storage areas of multiple FMPKs 144 (144-1 through 144-4) constituting the RAID group 145, and the stripes storing the parity in the RAID group 145 (the boxes having "P" as the initial letter, such as (P0) and (P1) in FIG. 4, are the stripes storing a parity) are not mapped to the storage area in the logical volume. The stripes storing the parity are called "parity stripes" in the present specification. Further, the stripes storing data are called "data stripes".

The data stored in the parity stripe is generated using the data stored in the data stripe. In the example of FIG. 4, the RAID group 145 has a RAID level of RAID5, and the parities stored in parity stripes (P0), (P1), (P2), through (Pn) are generated from the data stripes that exist in FMPKs 144 which are different from the FMPK 144 where each parity stripe exists, and that exist in the same addresses within the FMPKs 144 as the address where each parity stripe is stored. For example, the parity stripe (P2) is located at a third stripe from the beginning in the storage area of the FMPK 144-2. Therefore, the data stripes required to generate the parity stored in (P2) are the third data stripes (D(6), D(7) and D(8)) from the beginning in the FMPKs 144-1, 144-3 and 144-4 constituting the RAID group 145, and a result having calculated the exclusive OR (XOR) of the data stored in D(6), D(7) and D(8) is stored in the parity stripe (P2). In the following specification, a set of a parity stripe and data stripes used for generating the parity stored in the parity stripe (such as element 310 in the drawing) is called a "stripe group".

Since the storage area in the logical volume V0 and the storage area within the RAID group 145 are mapped based on the above-mentioned rule, so that when the host computer 30 accesses an area in the logical volume V0, it is possible to compute, through a relatively simple calculation, to which stripe within the FMPKs 144 constituting the RAID group 145 the access target area in the logical volume V0 is mapped. This is a method performed in well-known storage subsystems adopting a RAID function, so the details thereof will not be described here.

Next, we will describe the outline of the method for generating a parity performed in the storage system 10 according to the embodiment of the present invention. Though it will be described later in more detail, the FMPK 144 according to the preferred embodiment of the present invention has a function to calculate an exclusive OR (XOR) of the data stored in the respective storage areas and the update data designated by the controller 100, and the storage system 10 utilizes this function to generate a parity to be stored in the parity stripe.

Further, according to the storage system 10 of the present embodiment, as a parity generation method, a so-called read-modify-write method is used especially when using XOR calculation function in the FMPK 144. A read-modify-write method is a method for generating an updated parity when a certain data stripe within a stripe group is updated, not by calculating the XOR of all data stripes within the stripe group, but by calculating the XOR of the data in the FMPK 144 of the relevant data stripe (so-called data before update) and the updated data, and the parity before update in the parity stripe within the stripe group. Further, (the MPPK 120, the FEPK 110, the BEPK 140 or the CMPK 130 in) the controller 100 also has a parity calculation function, and it is also possible to generate parity using the parity calculation function in the controller 100.

Figure 5:
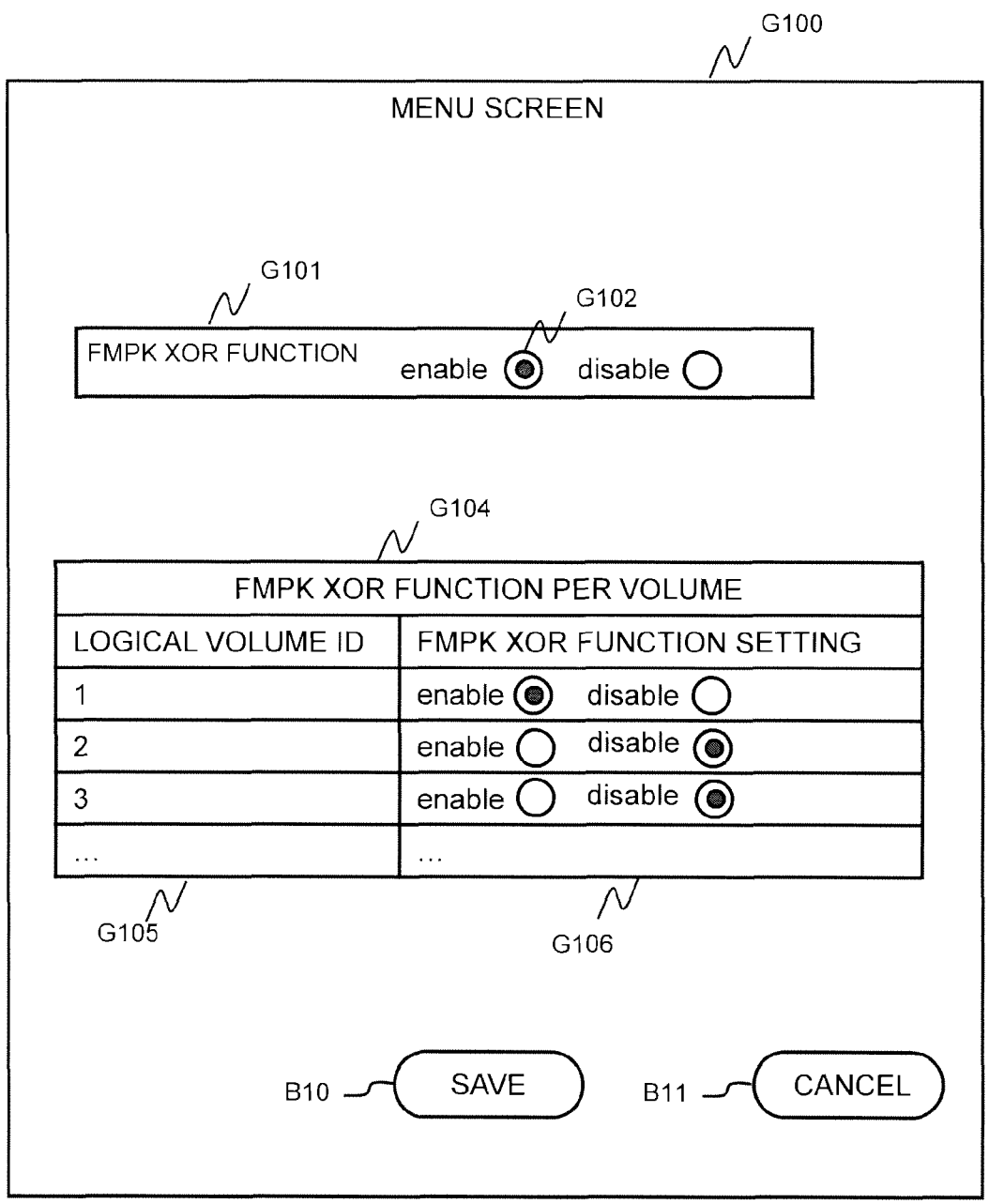
FIG. 5 illustrates one example of a setup screen of XOR calculation function.

Next, we will describe the setting of the parity operation function of the FMPK 144. The management computer 20 displays a menu screen for setting the parity operation function of the FMPK 144 on an internal display device, and enables the administrator to perform setting of the parity operation function of the FMPK 144. FIG. 5 illustrates one example of such menu screen. A menu screen G100 has a FMPK setting field G101, a logical volume setting field G104, a save button B10, and a cancel button B11.

The FMPK setting field G101 has a GUI for entering whether the XOR calculation function in the FMPKs 144 is valid or invalid, such as a radio button G102. The FMPK setting field G101 is an entry field of setting whether to enable use of the XOR calculation function in the FMPKs 144 or not.

Entry to the logical volume setting field G104 is enabled when the XOR calculation function in the FMPKs 144 is set to enable in the FMPK setting field G101, and the set information becomes valid. The logical volume setting field G104 has a logical volume ID setting field G105 and an FMPK XOR function setting field G106. The logical volume ID setting field G105 displays a logical volume ID defined in the storage system 10. The XOR function setting field G106 is an entry field for setting whether to enable use of the XOR calculation function in the FMPKs 144 to which the logical volume displayed in the logical volume ID setting field G105 is mapped. When "enable" is selected in the XOR function setting field G106 for a certain logical volume, when generating a parity of a RAID group to which the logical volume is mapped, a parity generation using the XOR calculation function in the FMPKs 144 is performed.

When the save button B10 is pressed, the setting information entered in the menu screen G100 is stored in the storage system 10. Specifically, regarding the logical volume where "enable" is selected in the XOR function setting field G106, the XOR Enable bit 304 of the volume management table 300 is set to 1 (when "disable" is selected, the XOR Enable bit 304 is set to 0). When the cancel button B11 is pressed, the contents entered in the menu screen G100 are cancelled without being saved in the storage system 10, and the menu screen G100 will be closed.

Next, using FIGS. 6 through 14, the flow of the overall write process performed in the storage system 10 according to the present embodiment will be described. In the following description, mainly the write process performed to a specific single stripe group of the data stored in the storage system 10 based on a write request from the host computer 30 will be described.

First, we will describe the meaning of the terms below. The data stripe within the stripe group is referred to as "Di" (wherein i is 1≤i≤number of data stripes within stripe group). D1 refers to a data stripe at the leftmost end of the stripe group, and the subsequent data stripes are sequentially referred to as D2, . . . , Dn (n=number of data stripes within the stripe group) (for example, in FIG. 4, the data stripe D(6) at the leftmost end of the stripe group 310 is referred to as D1,and the data stripe D(8) at the rightmost end is referred to as D3). Further, the parity stripe within the stripe group is referred to as "P". Further, the update data arriving from the host computer 30 to the data stripe Di is referred to as nDi. In contrast, the data before update regarding the relevant update data nDi is referred to as oDi. As a result of update of the data stripe, the parity after update to be stored in the parity stripe is referred to as "nP", and the parity prior to update is referred to as "oP".

As mentioned earlier, the FMPK 144 has a function to calculate an exclusive OR (XOR) of update data, and when the update data nDi is transmitted together with a prescribed command to the FMPK 144, the FMPK 144 can calculate the exclusive OR of the update data nDi and the oDi which is the data before update of the nDi, and output the result of the calculation to the controller 100. Now, the result of calculation of exclusive OR of the update data and the data before update is called an "intermediate parity". It is also sometimes referred to as "mPi".

Depending on the RAID level of the RAID group, such as RAID5 adopting a configuration where the parities are stored in a dispersed manner in multiple FMPKs 144 within the RAID group, it is not possible to specify a FMPK storing the parity uniquely, but when focusing on a specific single stripe group, the FMPK 144 storing a parity (parity stripe) within the stripe group is fixed at one specific FMPK within the RAID group (in a configuration where two parities are stored, such as RAID6,the number will be two). In the following specification, regarding a specific stripe group, the FMPK 144 storing the parity stripe within the relevant stripe group is referred to as "parity FMPK", and the FMPK 144 storing the data stripe is referred to as "data FMPK".

Figure 6:
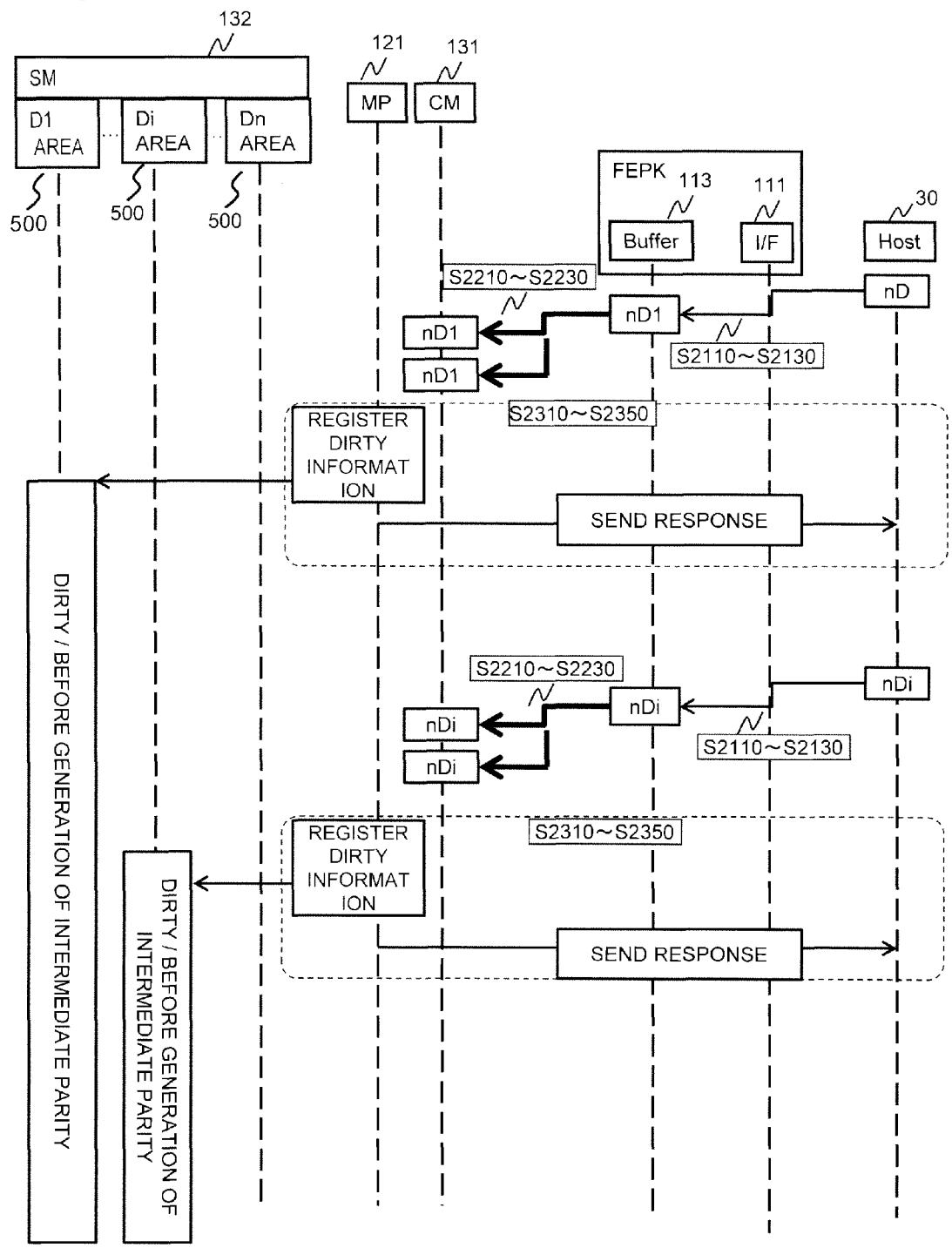
FIG. 6 illustrates a flow of the whole write process.
Figure 8:
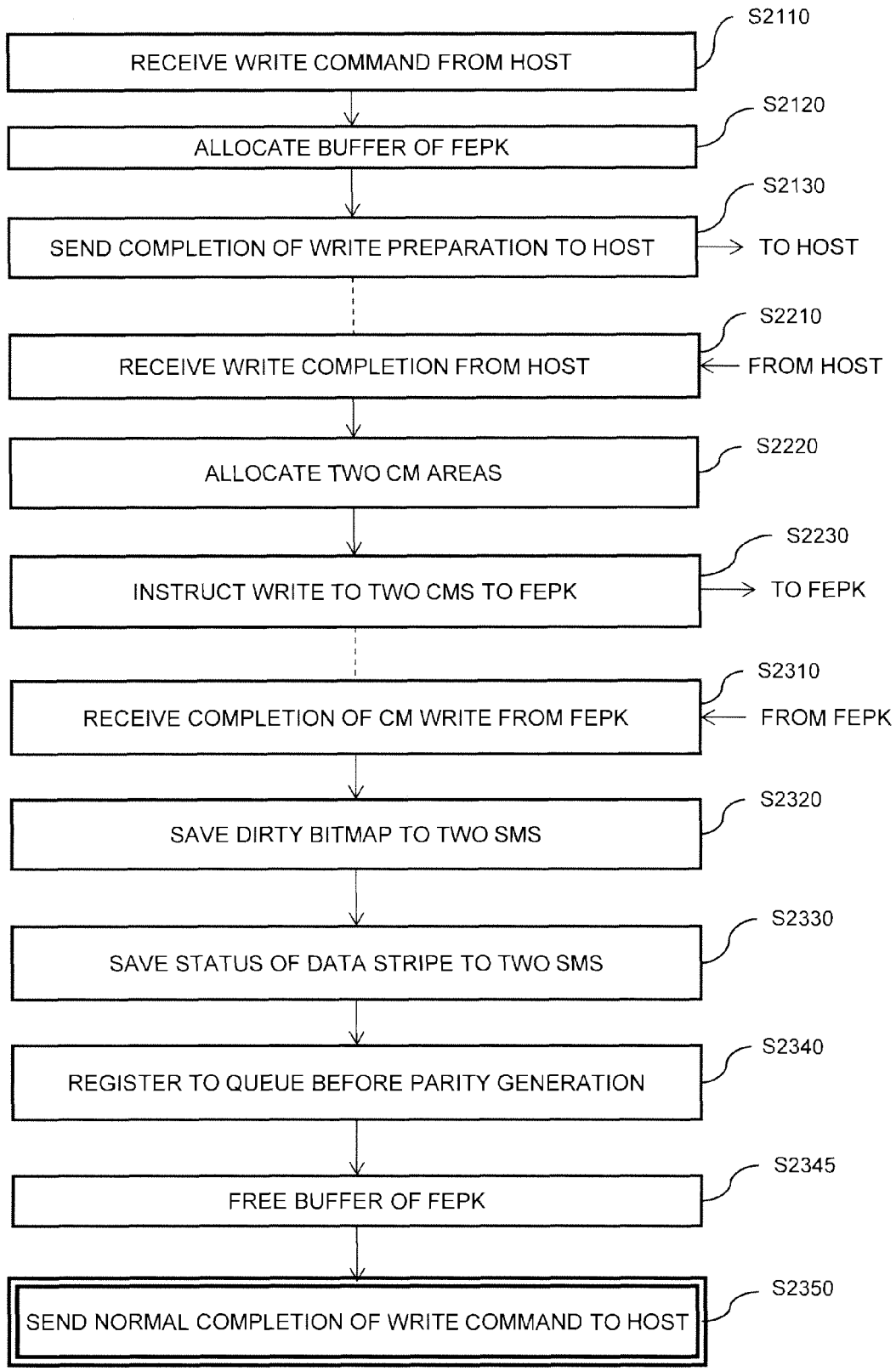
FIG. 8 illustrates a flow of the write process.

We will now describe the flow of the process from when the storage system 10 according to the present embodiment receives a write request of data (such as nD1 or nDi) from the host computer 30, stores the data in a cache memory (CM) 131, and notifies that the write process has been completed to the host computer 30, with reference to FIGS. 6 and 8. FIG. 6 shows the flow of data within the storage system 10, and FIG. 8 shows the flow of the process executed by the FEPK 110 and the MP 121 at that time.

FIG. 6 illustrates the flow performed when the storage system receives the write requests toward data stripes D1 and Di from the host computer 30, but a similar process will be performed when it receives a write request toward other data stripes. It is possible that the system receives multiple numbers of write requests toward the same data stripe, and especially when each write requests is the write request toward different area within a data stripe, multiple numbers of write data toward a single data stripe may be stored in a discontinuous manner in the cache memory.

When a write request toward data stripe Di is received from the host computer 30, the write data (nDi) accompanying the write request is temporarily stored in the buffer 113 of the FEPK 110, and thereafter, written in a duplex manner in the CM 131. When storing data to the CM 131, the MP 121 performs control so that the data subjected to duplex writing is stored in different CMs 131 of the CMPK 130. When nDi is stored in the CM 131, it updates the management information of the CM 131, and notifies the host computer 30 that the write process has been completed.

With reference to FIG. 8, we will describe the process executed by the FEPK 110 and the MP 121 at this time. At first, the FEPK 110 receives a write command from the host computer 30 (S2110). When it receives the write command, the FEPK 110 allocates an area for temporarily storing the write data in the buffer 113 (S2120), and thereafter, notifies the host computer 30 that a preparation for writing data has been completed (S2130). When the host computer 30 receives this notice, it starts transmitting the write data nDi.

When data transmission to the buffer 113 within the FEPK 110 of the write data nDi by the host computer 30 is completed, a notice notifying that data transmission has been completed is sent to the MP 121 (S2210). When the MP 121 receives this notice, it allocates areas in the CM 131 (one data stripe per each of the two CMPKs 130) (S2220), and instructs the FEPK 110 to perform data transmission from the buffer 113 to the area in the CM 131 (S2230). In response to receiving this instruction, the FEPK 110 executes data transmission to the CM 131.

When storage of data to the CM 131 is completed, the FEPK 110 notifies the MP 121 that data storage to the CM 131 has been completed. When the MP 121 receives this notice (S2310), it saves a dirty bitmap (S2320) and a status of the data stripes (S2330) in an area management information of the CM 131 in the SM 132. Further, the MP 121 registers the data stripes in a queue before parity generation (S2340). The processes of S2320 through S2340 and the information related to the processes will be described later.

Lastly, the MP 121 frees the area in the buffer 113 of the FEPK where write data Di has been temporarily saved (S2345), notifies the host computer 30 that the write process has been completed normally, and ends the write process.

We will now describe the area management information of the CM 131 updated in S2320 through S2340. When the MP 121 stores the write data from the host computer 30 in the CM 131, for example, when it receives a write data having a same or smaller size than a single data stripe, it allocates an area equal to the size of a single data stripe in the CM 131 as an area for storing the write data, and at the same time, creates an area management information for managing that area in the SM 132. When creating the area management information, the MP 121 duplicates the area management information by writing the area management information in respective SMs 132 of two CMPKs 130. In the following description, the area having the size of a single data stripe allocated in the CM 131 is called a "slot".

Figure 9:
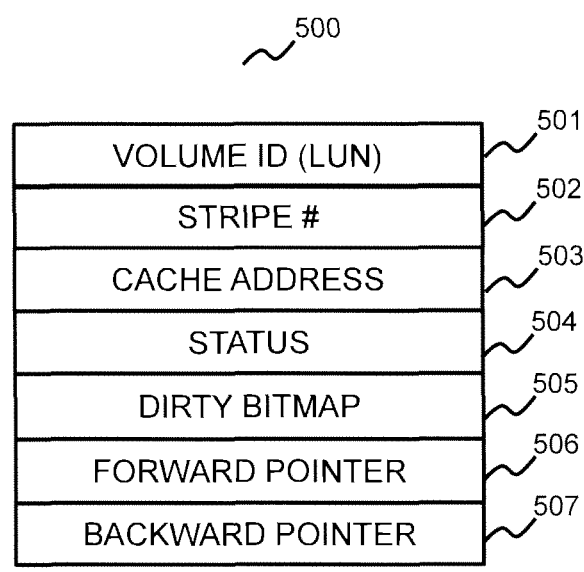
FIG. 9 illustrates a configuration of an area management information 500.

FIG. 9 illustrates a configuration of an area management information 500. The area management information 500 is composed of a volume ID 501, a data stripe number (referred to as "stripe #" in the drawing) 502, a cache address 503, a status 504, a dirty bitmap 505, a forward pointer 506, and a backward pointer 507.

The volume ID 501 and the data stripe number 502 show the storage position in the logical volume of the data stored in the slot managed by the area management information 500. The cache address 503 shows the address of the slot in the CM 131 managed by the area management information 500. The status 504 stores information showing the state of the slot. For example, if the data stored in the slot is not yet reflected in the FMPK 144, "dirty" information is stored therein, and if an intermediate parity corresponding to the data stored in the slot is not yet generated, then "before intermediate parity generation" information is stored therein. If the intermediate parity is already generated and the generated intermediate parity is already transmitted to the parity FMPK, then "after intermediate parity generation" information is stored therein. In the state where S2320 and 2330 of FIG. 8 are executed, the state of the slot is dirty (where data is not yet reflected in the FMPK 144), and intermediate parity generation is not performed, so that "dirty" and "before intermediate parity generation" information is stored in the status 504. Further, the reason why the information regarding the processing state of "before intermediate parity generation" or "after intermediate parity generation" is stored in the status 504 is that when failure occurs to the MP 121 during a destaging process described later and the destaging process is interrupted, another normal MP 121 is to be used to appropriately complete the destaging process. The details will be described later.

The dirty bitmap 505 shows the position of data storing data not yet reflected in the FMPK 144 (dirty data) out of the data stored in the slot. The actual use of the dirty bitmap 505 will be described later. The forward pointer 506 and the backward pointer 507 are used for connecting the area management information 500 to the queue before parity generation described later.

Next, we will describe the queue before parity generation. Slots in a state where generation of an intermediate party corresponding to the data in that slot is not completed and slots in a state where generation of an intermediate parity is completed exist in a mixture in the slots storing write data in the CM 131. The slots in a state where generation of an intermediate parity is not completed, or the slots in a state where generation of an intermediate parity has been completed but the parity generation after update using the intermediate parity is not performed, are managed by connecting to a queue before parity generation. For example, generation of an intermediate parity is not yet completed for the data immediately after storing the write data from the host computer 30 (FIG. 8: immediately after completing S2310), so the MP 121 connects this data to the queue before parity generation for management (FIG. 8: S2340).

Figure 10:
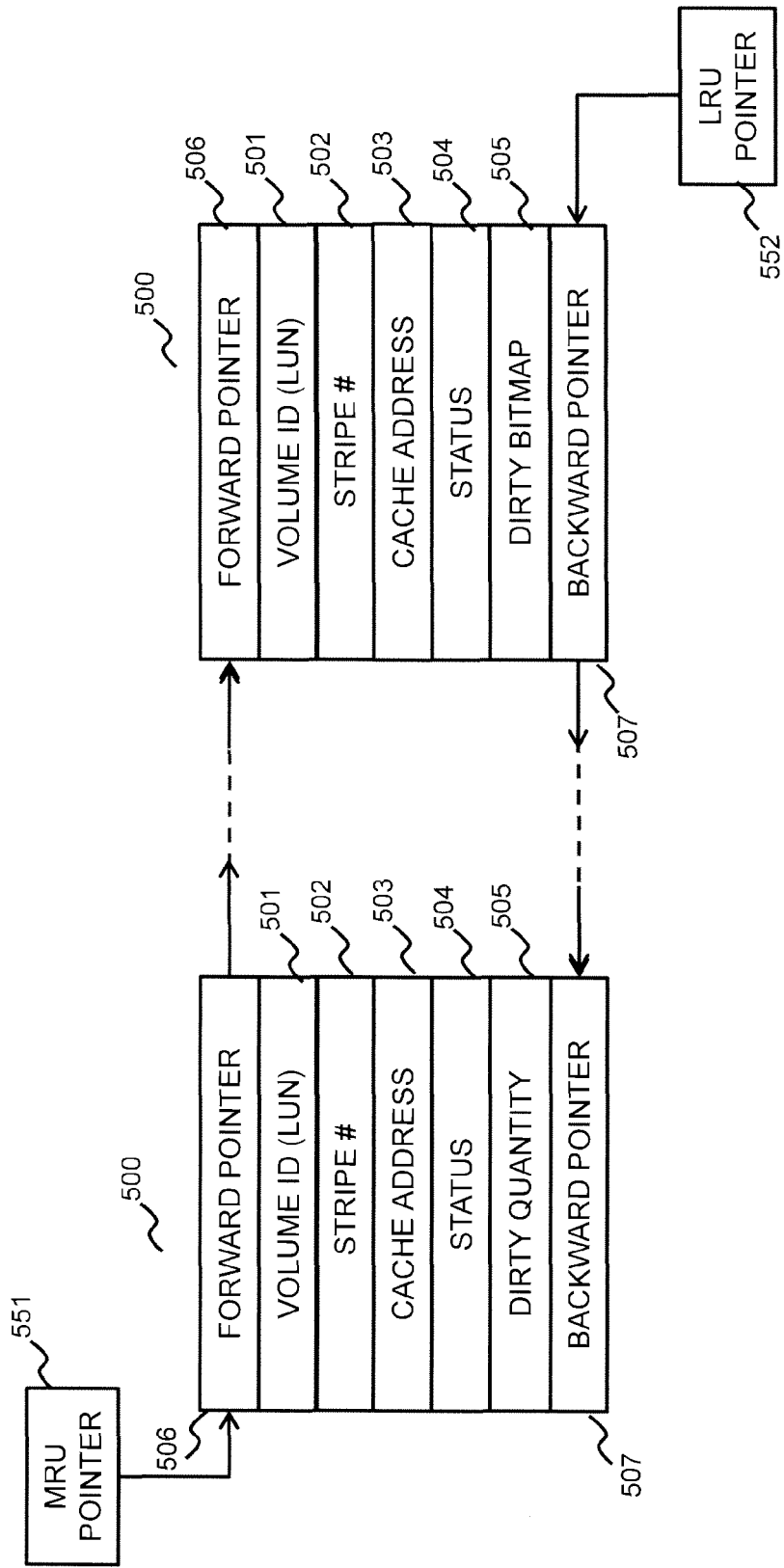
FIG. 10 illustrates a configuration of a queue before parity generation.

FIG. 10 illustrates a configuration of a queue before parity generation 550. The queue before parity generation 550 is a data structure formed by connecting multiple area management information 500 regarding slots where parity generation is not completed (including slots where generation of an intermediate parity has been completed but update processing of the parity corresponding to the intermediate party is not completed) using the forward pointer 506 and the backward pointer 507. Out of the multiple area management information 500, the area management information 500 of the slot where write data has been most recently stored in the CM 131 is connected to an MRU pointer 551 (specifically, a pointer to the area management information 500 of the slot where write data has been most recently stored in the CM 131 is stored in the MRU pointer 551). Then, a pointer to the next area management information 500 is stored in the forward pointer 506 of the area management information 500 connected to the MRU pointer. The area management information 500 of the slot storing the oldest data is connected to an LRU pointer 552, and the backward pointer 507 of the area management information 500 of the slot storing the oldest data stores a pointer to the area management information 500 of the slot storing the second oldest data.

Figure 14:
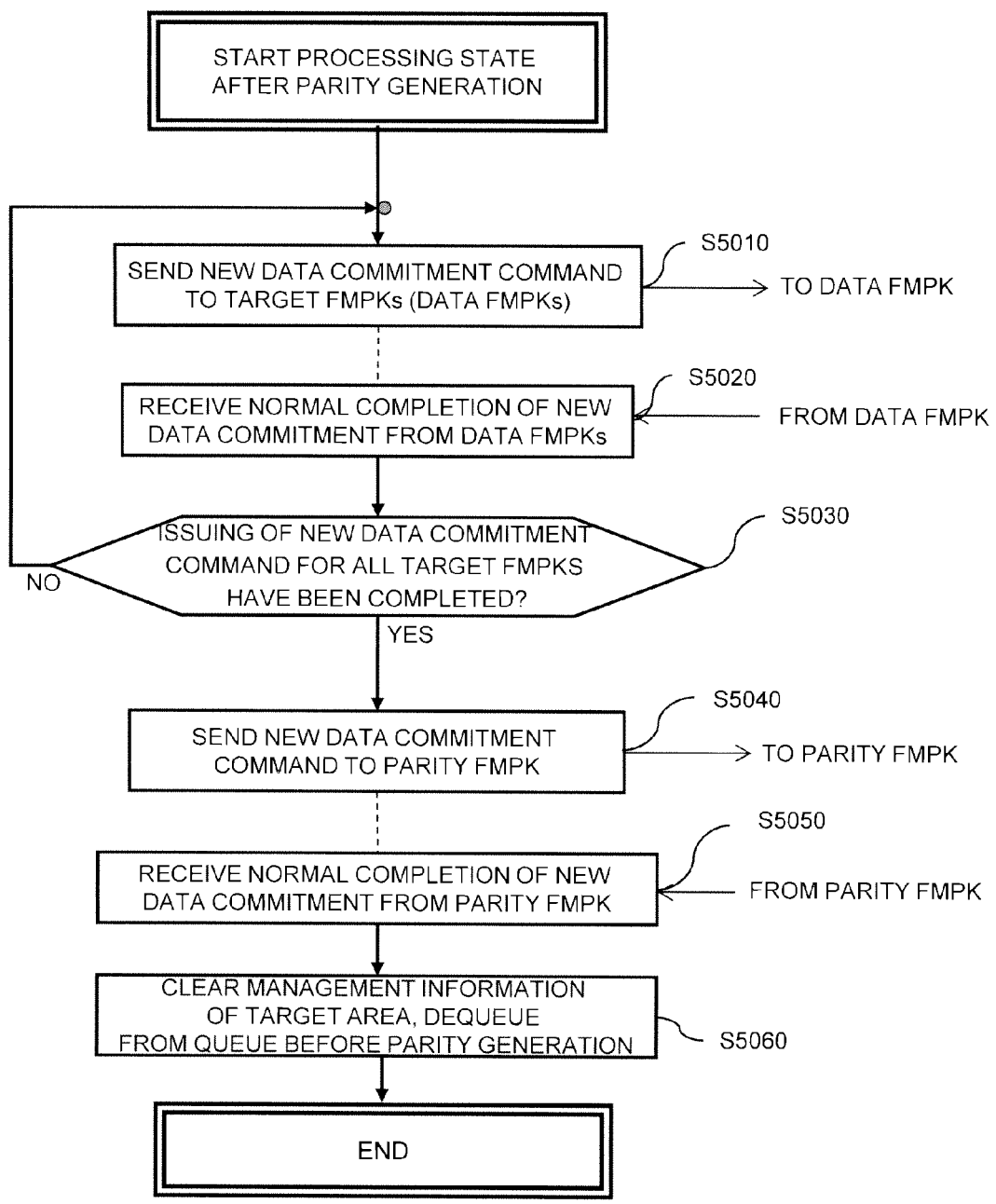
FIG. 14 is a flow of a process of the state after parity generation.

When write data from the host computer 30 is stored in a slot allocated in the CM 131, the area management information 500 of the slot is inserted before the area management information 500 pointed by the MRU pointer 551. In S2340 of FIG. 8, this process is performed by the MPU 121. The actual method of connection of the area management information 500 to the queue before parity generation is the same as a node addition process to a so-called bi-directional link list, so it will not be described in detail here. The area management information 500 connected to the queue before parity generation is removed from the queue before parity generation (dequeued) after the updated parity corresponding to the data in the slot managed by the area management information is stored in the parity FMPK (specifically, until S5060 of FIG. 14 is ended). When there is no slot in a state where parity generation is not completed, the queue before parity generation 550 will not be formed, wherein the MRU pointer 551 will point to the LRU pointer 552 and the LRU pointer 552 will point to the MRU pointer 551.

According to the storage system 10 of the present embodiment, only a single queue before parity generation 550 exists in the storage system 10. However, as another embodiment, it is possible to have multiple queues prior to generating a parity 550 exist in the storage system 10 (such as by forming the queue before parity generation 550 for each FMPK 144, for each logical volume, or for each RAID group).

Next, the flow of the destaging process performed in the storage system 10 according to the present invention will be described with reference to FIGS. 7 and 11 through 14. The destaging process is a process for storing the write data from the host computer 30 stored in the CM 131 to the FMPK 144, and during the process, parity generation process will also be performed. The destaging process is a process performed independently from the write process described in FIG. 6, and is executed when a given condition is satisfied after write data is stored in the CM 131 by the process of FIG. 6. Therefore, it is possible that multiple write requests from the host computer 30 to one data stripe is received before the destaging process is executed, and as a result, multiple number of data may be stored discontinuously in the data stripes (or in slots in the CM 131 corresponding to the data stripes).

The destaging process described hereafter is a process where parity generation using the XOR calculation function in the FMPK 144 is utilized. Therefore, it is assumed that the XOR calculation function is set to valid for each FMPK 144 constituting the RAID groups to which the destaging target data stripes and the corresponding parity stripe belong using the setup screen of the parity operation function of the FMPK 144 described with reference to FIG. 5. The storage system 10 according to the present embodiment is capable of performing parity generation using the parity operation function that the controller 100 has, so that when the MP 121 actually performs the destaging process, at the first of the destaging process, a process for determining whether or not the XOR calculation function in the FMPK 144 storing the data stripes and parity stripes being the destaging target is set to valid (enable) is performed. When the XOR calculation function in the FMPK 144 is set to valid (enable), the destaging process described later will be performed. However, this determination process is omitted in the process flow described below. Further, when the XOR calculation function in the FMPK 144 is set to invalid (disable), parity generation using the parity operation function in the controller 100 (such as the MPPK 120 or the BEPK 140) and the destaging process are performed, but since these processes are also performed in prior art storage systems, they will not be described in detail in the present specification.

Figure 7:
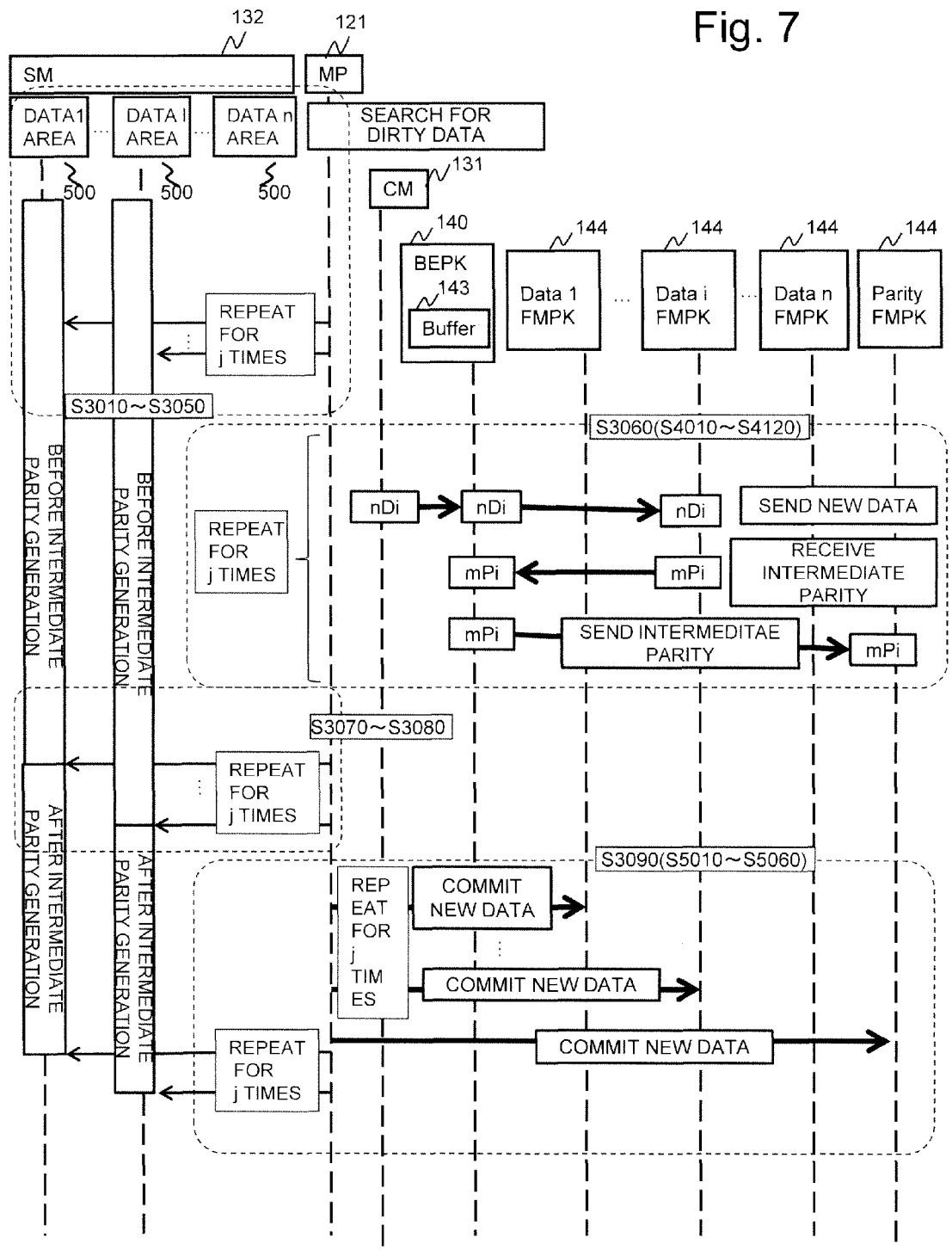
FIG. 7 illustrates a flow of the overall destaging process.

FIG. 7 illustrates the flow of data in the parity generation process, and FIGS. 11 through 14 are flowcharts of the process executed by the MP 121 in the parity generation process. Further, in FIG. 7, the areas denoted by S3010-S3050, S3060 (S4010-S4120), S3070-S3080, and S3090 (S5010-S5060) respectively show that S3010-S3050, S3060 (S4010-S4120), S3070-S3080, and S3090 (S5010-S5060) illustrated in FIGS. 11 through 14 are executed.

At first, using FIG. 11, the flow of the process executed by the MP 121 in the destaging process will be described. First, the MP 121 refers to the LRU pointer 552 of the queue before parity generation 550, and checks whether a slot in the state before generation of an intermediate parity or in the state after intermediate parity generation exists (S3010). If an area management information 500 designated by the LRU pointer 552 exists, it means that a slot in the state before intermediate parity generation or in a state after intermediate parity generation exists.

Next, the MP 121 searches for slots that belong to the same stripe group as the slot in a state before intermediate parity generation or in a state after intermediate parity generation detected in S3010, and having dirty entered in status 504. This process should be performed by referring to the volume ID (501) and the data stripe number 502 in the area management information 500 of the slot detected in S3010, and searching whether an area management information 500 that belongs to the same stripe group exists or not. We will now describe this process specifically with reference to FIG. 4. For example, in S3010, if an area management information 500 having number 7 as the data stripe number 502 is detected, the data stripe numbers of the data slots belonging to the same stripe group are 6 and 8. Therefore, the area management information 500 in which the data stripe numbers 502 are 6 or 8 are searched, and whether the statuses 504 of these area management information 500 are dirty or not is confirmed (of course, another condition is that the logical volume IDs 501 are the same).

In S3030, the MP 121 stores the number of slots detected in S3010 and S3020. The number of slots detected in S3010 and S3020 are equal to the number of FMPKs 144 being the target of instructing generation of intermediate parity.

In S3040, the MP 121 refers to the status 504 of the area management information 500 of the slot detected in S3010 and S3020, and determines whether the status 504 is before intermediate parity generation or after intermediate parity generation. Regarding the slot corresponding to the area management information 500 whose status 504 is before intermediate parity generation, S3050 and subsequent steps are performed. Regarding the slot corresponding to the area management information 500 whose status 504 is after intermediate parity generation, the processing of the state after parity generation of S3090 will be executed. The processing of the state after parity generation will be described in detail later.

In S3060, the MP 121 performs an FMPK data transmission and reception process, that is, performs a process to transmit the data in the respective slots having the status 504 set to before intermediate parity generation to the data FMPK, and performs a process to receive the intermediate parity from the data FMPK and transmit the same to the parity FMPK. This process will be described later. When transmission and reception toward data FMPK 144 and parity FMPK 144 of the parity for all target slots have been completed (S3070), the MP 121 changes the status 504 of the target slots to after intermediate parity generation (S3080). Thereafter, the processing of the state after parity generation is executed (S3090). The processing of the state after parity generation will be described later.

We will now describe the reason why a check is performed on whether there is an area management information 500 having the status 504 set to after intermediate parity generation or not in S3040. According to the storage system 10 of the preferred embodiment of the present invention, when failure occurs to the MP 121 during the destaging process and the process is interrupted, a different MP 121 operating normally (hereinafter referred to as an alternative MP) will perform the destaging process of FIG. 11 (takes over the destaging process). When failure occurs when executing S3090 of FIG. 11, for example, the area management information 500 of the slot being the processing target at that time will remain in the SM 132 in a state connected to the queue before parity generation, and with the state "after intermediate parity generation" stored in the status 504. Therefore, when the alternative MP executes the destaging process, it can detect the slot whose processing is in an interrupted state from the queue before parity generation. In this case, the processing of S3060 (data transmission/reception processing of FMPK) is already executed for this slot, so the alternative MP executes the processing of the state after parity generation of S3090. Further, when failure occurs during execution or before execution of S3060 of FIG. 11, the area management information 500 of the slot set as the processing target at that time remains in the SM 132 in a state being connected to the queue before parity generation and the information "before intermediate parity generation" stored in the status 504. In this case, it is necessary to perform the process of S3060 (data transmission/reception processing of FMPK), so the alternative MP executes the process of S3060.

Figure 11:
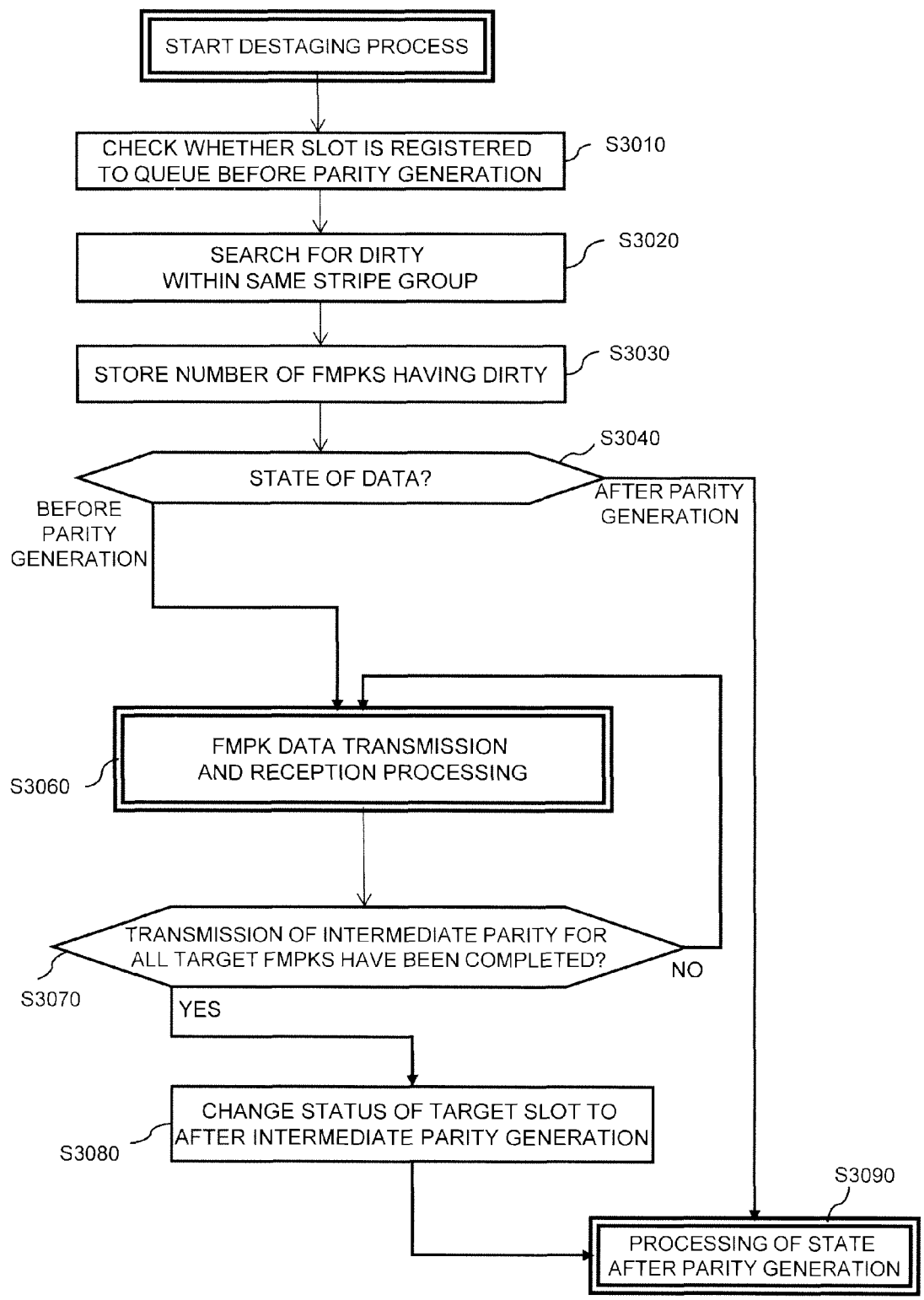
FIG. 11 illustrates a flow of the destaging process.

Next, we will describe the flow of the FMPK data transmission and reception process performed in S3060 of FIG. 11. At first, the outline of the flow of data and the process performed in the FMPK data transmission and reception process will be described with reference to FIG. 7. As shown in FIG. 7, the FMPK data transmission and reception process (area referred to as S3060 (S4010-S4120)) transmits the data (nDi) in the CM 131 to the FMPK 144. Here, the MP 121 performs data transmission by issuing a new data transmission command (described later) to the FMPK 144.

Next, the MP 121 issues an intermediate parity reception command (described later) to the FMPK 144 to cause the FMPK 144 to perform an XOR operation of nDi and oDi. The result of the XOR operation (mPi) of nDi and oDi is transmitted to the buffer 143 of the BEPK 140. Thereafter, the MP 121 transmits an intermediate parity transmission command (described later) together with an intermediate parity mPi temporarily stored in the buffer 143 to the FMPK 144 (parity FMPK) storing the parity stripe corresponding to nDi, and causes the parity FMPK to store the mPi.

In the data flow illustrated in FIG. 7, the processing of only one data stripe is shown, but if data in the state before intermediate parity generation of multiple data stripes within a stripe group is stored in the CM 131, the process described above is performed for multiple times (for a number of times equal to the number of data stripes stored in the CM 131 whose status 504 is in a state before intermediate parity generation).

Figure 12:
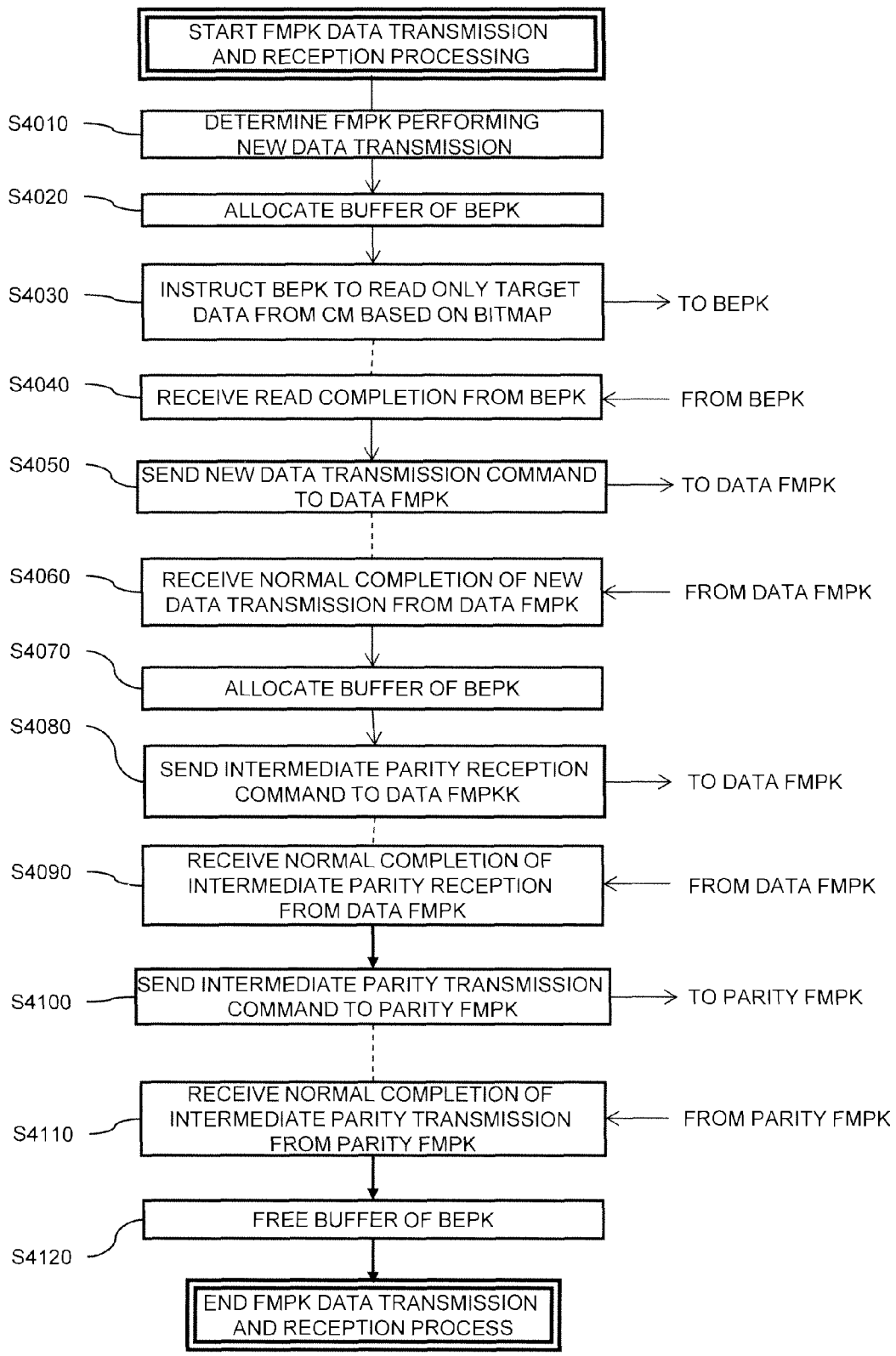
FIG. 12 illustrates a flow of a data transmission and reception process to FMPK.

We will describe the process illustrated above with reference to FIG. 12, especially focusing on the process executed by the MP 121. The process illustrated in FIG. 12 shows the flow of the process of transmission of updated data and the reception of an intermediate parity corresponding to the updated data with respect to one data stripe. Therefore, if updated data corresponding to multiple data stripes within one stripe group is stored in the CM 131, the process of FIG. 12 is executed for each data stripe having updated data stored in the CM 131 (the data also having the status 504 set to before generation of intermediate parity).

At first, the MP 121 determines the FMPK 144 of the issue destination of the new data transmission command, and the address in the storage space of the FMPK 144 set as the new data storage destination (S4010). This determination is performed by using the volume ID 501 and the data stripe number 502 of the area management information 500 corresponding to the processing target slot, and this process is similar to the process performed in a well-known storage system for converting a logical volume address to a physical disk address, so the description thereof is omitted.

Next, the MP 121 allocates an area in the buffer 143 in the BEPK 140 (S4020), and in S4030, determines the data to be transmitted to the buffer 143 from the data in the slot in the CM 131 based on the dirty bitmap 505, and instructs the BEPK 140 to transmit the transmission target data from the CM 131 to the buffer 143.

When the MP 121 receives a notice that reading of data has been completed from the BEPK 140 (S4040), the MP 121 transmits a new data transmission command to the FMPK (FMPK 144 determined in S4010) that should store the data of the processing target slot (S4050).

Figure 13:
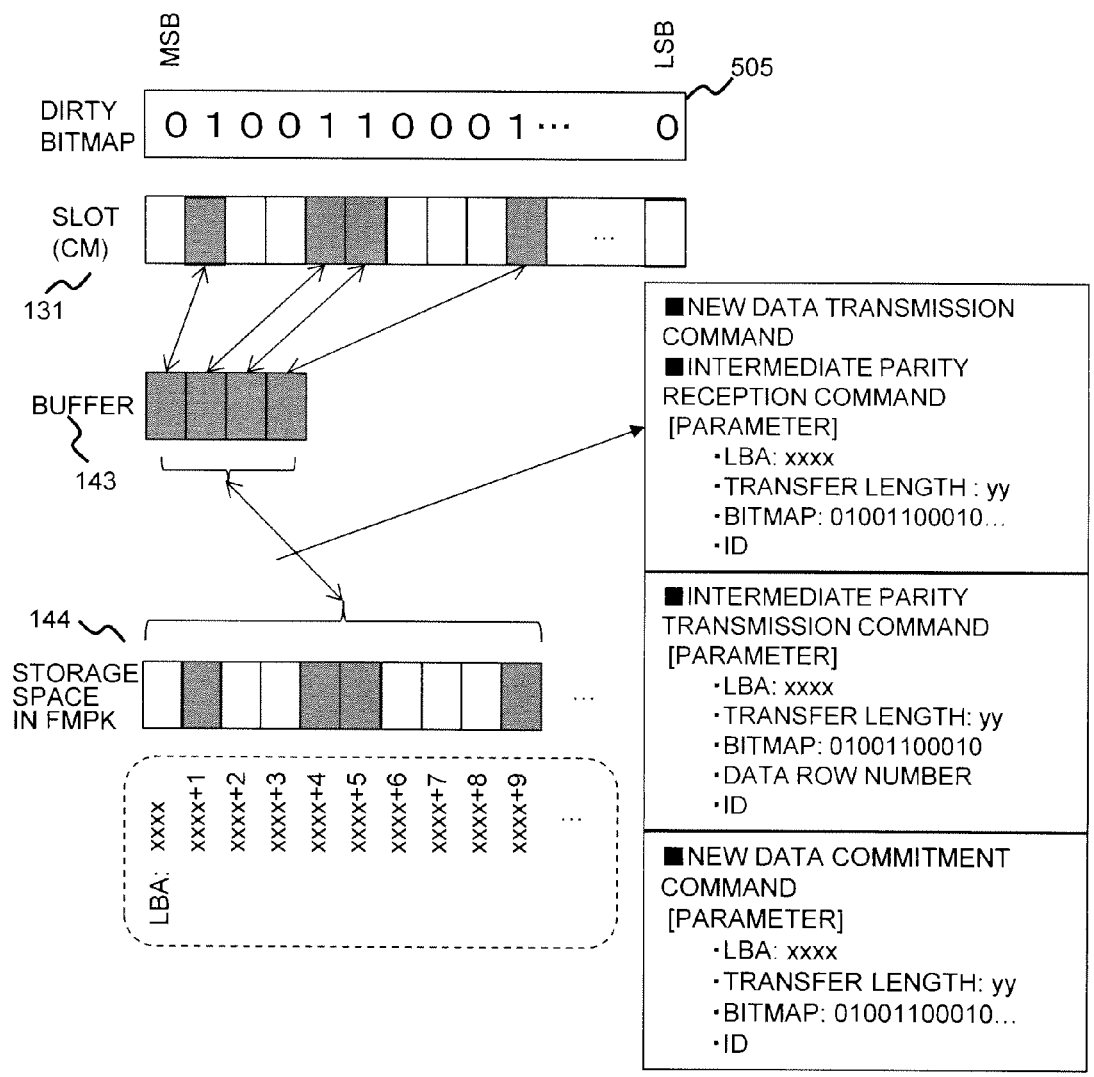
FIG. 13 is an explanatory view of the configuration of a dirty bitmap and the command parameters transmitted to the FMPK.

The processes of S4030 and S4050 will be described with reference to FIG. 13. In FIG. 13, slot 131 shows an area in the CM 131 allocated in correspondence to one data stripe, and the size thereof is equal to the size of the data stripe. The box on the left end of the slot 131 (white area) represents a sector positioned at the start of the slot (one sector corresponds to a 512-byte area, which is a minimum unit of access from the host computer 30 to the logical volume), and the box on the right end (white area) represents a sector positioned at the rear end of the slot.

The dirty bitmap 505 shows the position in which dirty data is stored of the data stored in the slot of the CM 131. In the present embodiment, the respective bits of the dirty bitmap 505 correspond to one sector within the slot, wherein the most significant bit (MSB) of the dirty bitmap 505 shows whether dirty data is stored in the leading sector of the slot or not, and the least significant bit (LSB) shows whether dirty data is stored in the last sector in the slot or not. When 1 is stored in each bit, it means that dirty data is stored therein. However, it is also possible to adopt a configuration, for example, where each bit of the dirty bitmap corresponds to an area having a size other than one sector, such as a size of one page which is the read/write unit of the flash memory (FM 1443).

The black areas in the areas of the slots in the CM 131 in the drawing show that dirty data is stored therein (in other words, dirty data is stored in the second, fifth, sixth and tenth sectors counting from the beginning of the slot). In this case, 1 is stored in the second, fifth, sixth and tenth bits from the most significant bit in the dirty bitmap 505 (the setting of the dirty bitmap 505 is performed in S2320, as mentioned earlier).

In S4030, the MP 121 refers to the dirty bitmap 505, and instructs the BEPK 140 to store the data stored in the sectors within the slot corresponding to the bits storing 1 to the buffer 143. When the BEPK 140 receives this instruction, only the data in the sectors storing dirty data are read into the buffer 143. When data is read into the buffer 143, the data is stored in a packed manner from the beginning of the area allocated in the buffer 143 (FIG. 13 shows the state of dirty data stored in the buffer 143).

The format of the new data transmission command that the MP 121 issues to the FMPK 144 in S4050 will be described. In the parameter of the new data transmission command (and the intermediate parity reception command described later), four types of information, which are the initial address (LBA) of the access target area (in the FMPK 144), the data transmission length, the bitmap and the ID, are included (other information can be included, but since they are not directly related to the description of the present invention, the description thereof is omitted). The initial LBA of the access target area and the data transmission length are similar to the parameters designated for example by the write command supported by HDDs and other well-known storage devices (hereinafter referred to as "normal write command"), and the area in the range designated by the initial LBA of the access target area and the data transmission length will be the access (write) target range by the new data transmission command.

However, the meaning of the access (write) target range (range specified by the initial LBA of the access target area and the data transmission length) designated by the new data transmission command somewhat differs from the access target range designated by the normal write command. When a normal write command is issued, data is stored in the whole area designated by the access target range in the issue destination storage device (such as the HDD). On the other hand, when a new data transmission command is issued to the FMPK 144, the FMPK 144 will not store data in the whole area designated by the access target range, but only the area where the bitmap is set to ON (1) within the area designated by the access target range is set as the access (data storage) target area. The same applies for other commands (such as an intermediate parity transmission command or an intermediate parity reception command) described hereafter.

As mentioned above, the command such as the new data transmission command supported by the FMPK 144 store data in the area determined by the access target range and the bitmap (or reads data from the area determined by the access target range and the bitmap). Therefore, as shown in FIG. 13, even when areas storing dirty data are arranged discontinuously in the slots, the dirty data in the slots can be transmitted to the FMPK 144 by issuing a new data transmission command once. The contents of the dirty bitmap 505 can be used as it is as the contents of the bitmap contained in the parameter of the new data transmission command.

As an example, when transmitting the data in a slot state of FIG. 13 (where dirty data is stored in second, fifth, sixth and tenth sectors of the slot, and dirty data is not stored in other areas) to an area where the initial address is "xxxx" in the LBA of the FMPK 144 (and this position is the initial position of the data stripe in which the write target exists), "01001100010 . . . (the following bits are all zero)" should be designated as the bitmap. Further, as for the initial LBA, "xxxx" which is the initial LBA of the data stripe is designated, and the size of a slot (one data stripe) is designated as the data transmission length.

However, the designation of parameters is not restricted to the designation method mentioned above. The access target range designated by the initial LBA and the data transmission length should only designate the area containing the dirty data to be transmitted, so that when the storage state of the dirty data in the slot is as shown in FIG. 13, it is possible to designate "xxxx+1" as the initial LBA, 9 as the data transmission length (length including the last dirty data), and "1001100010 . . . (following bits are all zero)" as the bitmap. However, in the following description of the preferred embodiment of the present invention, we will assume that the initial LBA of the data stripe (or parity stripe) is designated as the initial LBA and a size corresponding to one stripe is designated as the data transmission length as the command parameters of the respective commands.

By issuing a new data transmission command designating such bitmap, write data is arranged in the FMPK 144 according to the arrangement designated by the bitmap in the storage space provided to the controller 100 from the FMPK 144. However, the timing in which the write data is formally arranged in the storage space provided by the FMPK 144 to the controller 100 is not when the new data transmission command is issued, but after a new data commitment command described later is issued (incidentally, the storage media used in the FMPK 144 is a flash memory, so the address space provided to the controller 100 differs from the address space of the physical storage media such as the FM 1443, and the data is not necessarily stored in the arrangement illustrated in FIG. 13 in the FM 1443; however, it is recognized by the controller 100 that data is arranged in such an arrangement illustrated in FIG. 13).

Further, the ID included in the parameters of the new data transmission command (and the intermediate parity reception command and the like described later) is assigned so that the FMPK 144 recognizes that the received command is a series of commands related to the parity generation process to a specific single stripe group. When the MP 121 instructs the respective FMPKs 144 to perform a process to a specific single stripe group (a new data transmission command, an intermediate parity transmission command, an intermediate parity reception command, and a new data commitment command), the MP 121 designates the same values for the IDs of the respective commands. For example, in a RAID group disclosed in FIG. 4, in order to instruct storage of updated data and generation of parities to stripes (D(6), D(7), D(8) and P2) belonging to the stripe group 310, the MP 121 designates a same value as the ID of the parameter in all commands issued to the FMPK 144-1 through 144-4. When a command is issued to a stripe belonging to a stripe group that differs from the stripe group 310 (for example, the stripe group 320), an ID of a value that differs from the ID contained in the command issued to the stripe group 310 will be designated.

We will now return to the description of FIG. 12. When the MP 121 receives a notice from the FMPK 144 having transmitted the new data transmission command notifying that the new data transmission process has been completed normally (S4060), it allocates an area for storing the intermediate parity in the buffer 143 of the BEPK 144 (S4070). Thereafter, it creates an intermediate parity reception command and sends the same to the FMPK 144 which is the same FMPK 144 having issued the new data transmission command in S4050 (S4080).

The parameters contained in the intermediate parity reception command that the MP 121 issues to the FMPK 144 are, similar to the parameters of the new data transmission command, the initial address (LBA) of the access target area in the FMPK 144, the data transmission length, the bitmap and the ID. In addition, when an intermediate parity reception command is issued, an intermediate parity is received as a result, so the storage destination of the intermediate parity (actually, an address in the buffer 143) will be included.

When the MP 121 creates a parameter to be included in the intermediate parity reception command, the same information included in the parameter of the new data transmission command in S4050 will be designated as the initial LBA of the access target area, the data transmission length, the bitmap and the ID. By issuing commands storing the same ID as parameters to both the new data transmission command and the intermediate parity reception command, the FMPK 144 having received the intermediate parity reception command can recognize that an intermediate parity can be generated based on new data (nDi) transmitted by the new data transmission command and received earlier, and a data before update (oDi) corresponding thereto.

When the FMPK 144 receives an intermediate parity reception command, it creates an intermediate parity, and transmits the same to the BE I/F 141. The BE I/F 141 stores the intermediate parity received from the FMPK 141 to the area in the buffer 143 allocated in S4070.

When the storing of the intermediate parity to the buffer 143 is completed, the FMPK 144 transmits a notice to the MP 121 notifying that the intermediate parity reception command has been normally completed. When the MP 121 receives this notice (S4090), a command (intermediate parity transmission command) is created for transmitting the intermediate parity stored in the area of the buffer 143 allocated in S4070 to the parity FMPK (S4100).

Parameters included in the intermediate parity transmission command issued by the MP 121 to the FMPK 144 include the initial LBA of the access target area, the data transmission length, the bitmap and the ID, which are similar to the new data transmission command, and even further, a data row number. Regarding the intermediate parity transmission command transmitted to the parity FMPK in S4100, the same information included in the new data transmission command transmitted in S4050 will be designated as the initial LBA of the access target area, the data transmission length, the bitmap, and the ID.

We will now describe a data row number, which is a parameter newly included in an intermediate parity transmission command. The data row number is a parameter for designating which position of the data stripe within a stripe group the intermediate parity transmitted by the intermediate parity transmission command is generated from. An actual example thereof will be described with reference to FIG. 4. When performing parity update of the stripe group 310, the FMPK 144-2 will be the parity FMPK, and an intermediate parity is transmitted to the FMPK 144-2. In this case, the data row number of D(6) which is the leftmost data stripe within the stripe group is defined as 0, the data row number of D(7) which is the next data stripe is defined as 1, and the data row number of D(8) which is positioned on the right side thereof is defined as 2. Therefore, when transmitting the intermediate parity of data stripe D(8) to the FMPK 144-2, the MP 121 creates a command designating 2 as the data row number, and transmits the same to the FMPK 144-2.

It is not necessary to determine the data row numbers of D(6), D(7) and D(8) designated when issuing the intermediate parity transmission command based on the above-described rule (that is, it is not necessary that the data row number of the leftmost data stripe is 0). For example, when transmitting the intermediate parity of D(6), D(7) and D(8) to the parity FMPK together with the intermediate parity transmission commands, it is merely necessary that different data row numbers are designated as the parameters of the respective commands.

We will now return to the description of FIG. 12. When the MP 121 receives a notice from the parity FMPK that the processing of the intermediate parity transmission command has been completed normally (S4100), it frees the area of the buffer 143 allocated for the FMPK data transmission and reception process (area allocated in S4020 and S4070) (S4120), and ends the process.

When the process of S3060 of FIG. 11 (FIG. 12: S4010-S4120) is completed for all slots being the target of intermediate parity generation, the process of S3090 will be performed after S3070 and S3080. As shown in FIG. 7, in S3090, a process is executed to transmit a new data commitment command to all the FMPKs 144 where new data transmission (and reception of intermediate parity) has been performed (the FMPK 144 storing data stripes where data update has occurred) and the FMPK 144 where intermediate parity transmission has been performed (which is the parity FMPK).

The parameters contained in the new data commitment command are, similar to the new data transmission command, an initial LBA of the access target area, the data transmission length, the bitmap, and the ID. When issuing a new data commitment command to the data FMPK, the MP 121 designates the same parameters as the parameters transmitted when the new data transmission command has been issued. On the other hand, when issuing a new data commitment command to the parity FMPK, the same parameters as those designated when the intermediate parity transmission command has been issued are used as the initial LBA of the access target area, the data transmission length and the ID out of the multiple types of command parameters. However, as for the bitmap, when intermediate parity transmission commands are issued for multiple times to the parity FMPK (which occurs when multiple data stripes within a stripe group have been updated), the MP 121 computes the logical sum (OR) of the bitmaps designated by the respective intermediate parity transmission commands (or the new data transmission commands), and designates it as the parameter of the new data commitment command.

The FMPK 144 to which new data has been transmitted will have the data transmitted by the new data transmission command formally stored in the FMPK 144 only after the new data commitment command is received. Only when the parity FMPK has received the new data commitment command, it generates a parity after update based on the intermediate parities that have been transmitted and the parity before update stored in the FMPK 144, and stores the parity after update in the storage media within the FMPK 144.

The flow of the process executed by the MP 121 in the process of the state after parity generation of S3090 will be described with reference to FIG. 14.

At first, the MP 121 transmits a new data commitment command to all FMPKs 144 having transmitted the new data transmission command and the like in a previous processes (that is, the FMPKs 144 having transmitted the updated data) (S5010). When the MP 121 receives notices from the respective FMPKs 144 that the new data commitment command has been normally completed (S5020), and it receives notices from all process target FMPKs 144 that the new data commitment command has been normally completed (S5030: YES), the MP 121 transmits a new data commitment command to the parity FMPK (S5040). When it receives a notice from the parity FMPK that the new data commitment command has been normally completed (S5050), the contents of the area management information 500 of the processing target slot are cleared (S5060). Specifically, the contents of the status 504 and the dirty bitmap 505 are set to NULL, and the area management information 500 of the processing target slot is removed from the queue before parity generation 550 (dequeued). When the process of S5060 is completed, the processing of the state after parity generation is ended.

According to the example illustrated above, a new data commitment command is transmitted to the parity FMPK after the new data commitment command has been transmitted to all the FMPKs 144 having transmitted the new data transmission command, but this order can be opposite.

In the following, we will illustrate the process performed when the FMPK 144 receives a new data transmission command, an intermediate parity reception command, an intermediate parity transmission command or a new data commitment command, and the contents of the information managed in the FMPK 144. The FMPK 144 according to the present embodiment supports read commands and write commands supported by normal (known) storage devices, in addition to the new data transmission command, the intermediate parity reception command, the intermediate parity transmission command or the new data commitment command. A read command and a write command are used when parity generation that does not use the XOR calculation function in the FMPK 144 is performed.

At first, we will describe the management information used in the FMPK 144. The FMPK 144 provides a logical storage space (hereinafter referred to as logical address space) to the external device/external equipment, such as the controller 100 (MP 121) that the FMPK 144 is connected to, and allows access (such as read or write) to the logical address space from the MP 121. This logical storage space differs from the address of the storage area of the FM 1443, wherein when the FMPK 144 receives a write request designating an area in the logical address space from the MP 121, it allocates an unused area of the FM 1443 (such as the unused physical page) as the physical storage area corresponding to that area. Then, the FMPK 144 records and manages the corresponding relationship between the area in the logical address space and the storage area in the FM 1443 allocated to that area in a logical address management information 4000.

Figure 15:
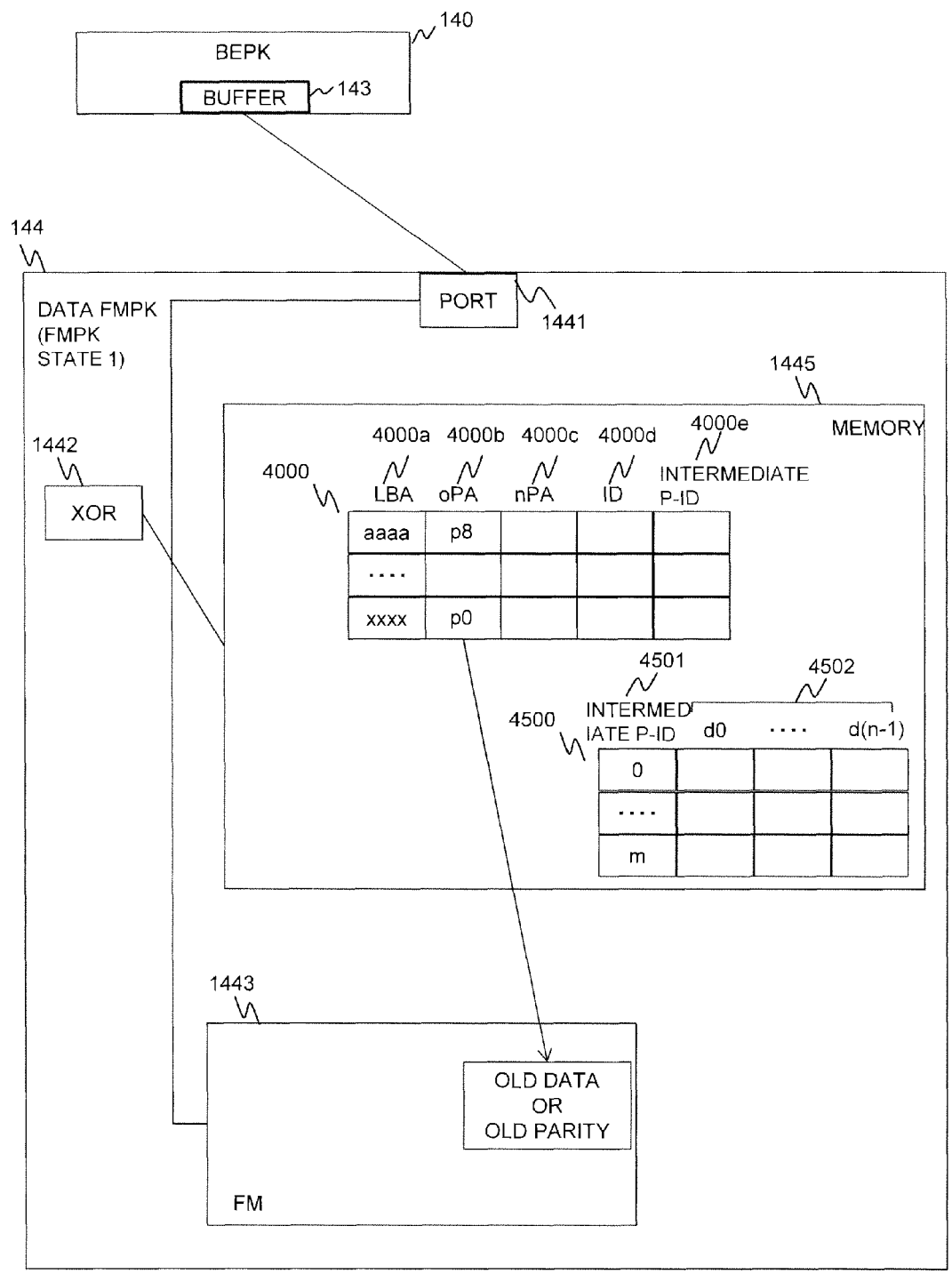
FIG. 15 is an explanatory view of a logical address management information 4000 in the FMPK.

We will now describe the information stored in the logical address management information 4000 with reference to FIG. 15. The logical address management information 4000 includes the following entries for each LBA 4000a, which is an address in a logical address space provided to the controller 100: oPA 4000b, nPA 4000c, ID 4000d, and intermediate parity ID (intermediate P-ID) 4000e.

The oPA 4000b stores a pointer to the data (or parity) stored in the LBA 4000a, that is, the address in the FM 1443 (called a physical address) mapped to the LBA 4000a. When an updated data (new data) is received regarding the LBA 4000a, the nPA 4000c stores the physical address in the FM 1443 storing that new data. The ID 4000d stores the ID designated by the new data transmission command or the like. The intermediate parity ID (intermediate P-ID) 4000e is an item used when the intermediate parity transmission command has been received, which will be described in detail later.

According to the description of the present embodiment, the size of the storage area managed by each LBA 4000a in the logical address management information 4000 is equal to the size of the area specified by one bit of the bitmap transmitted via the new data transmission command or the like, that is, a sector. However, if a configuration is adopted where one bit of the bitmap is used as information for specifying an area having a size other than one sector (such as one page, which is a minimum read/write unit of the FM 1443), the size of the storage area managed by the respective LBAs 4000a can be changed accordingly.

In the initial state (immediately after starting the storage system 10, before execution of the parity generation process, or after completion of the parity generation process), the address of the physical storage area mapped to the LBA 4000a is stored in the oPA 4000b, but NULL is stored in the other entries. Hereafter, this state is referred to as "state 1". When the state of the FMPK 144 is in "state 1", if the FMPK 144 receives a read command (same as the read command supported by a well-known HDD and the like), for example, the FMPK 144 operates to refer to the oPA 4000b mapped to the LBA 4000a, read data from the physical address area specified by the oPA 4000b, and return the data to a command transmission source (such as the MP 121). Further, when the FMPK 144 receives a write command, the write data is stored in an unused area within the FM 1443, and the physical address of the area storing the write data is stored in the oPA 4000b. The area within the FM 1443 having stored the data before update is set as an ineffective area.

Figure 16:
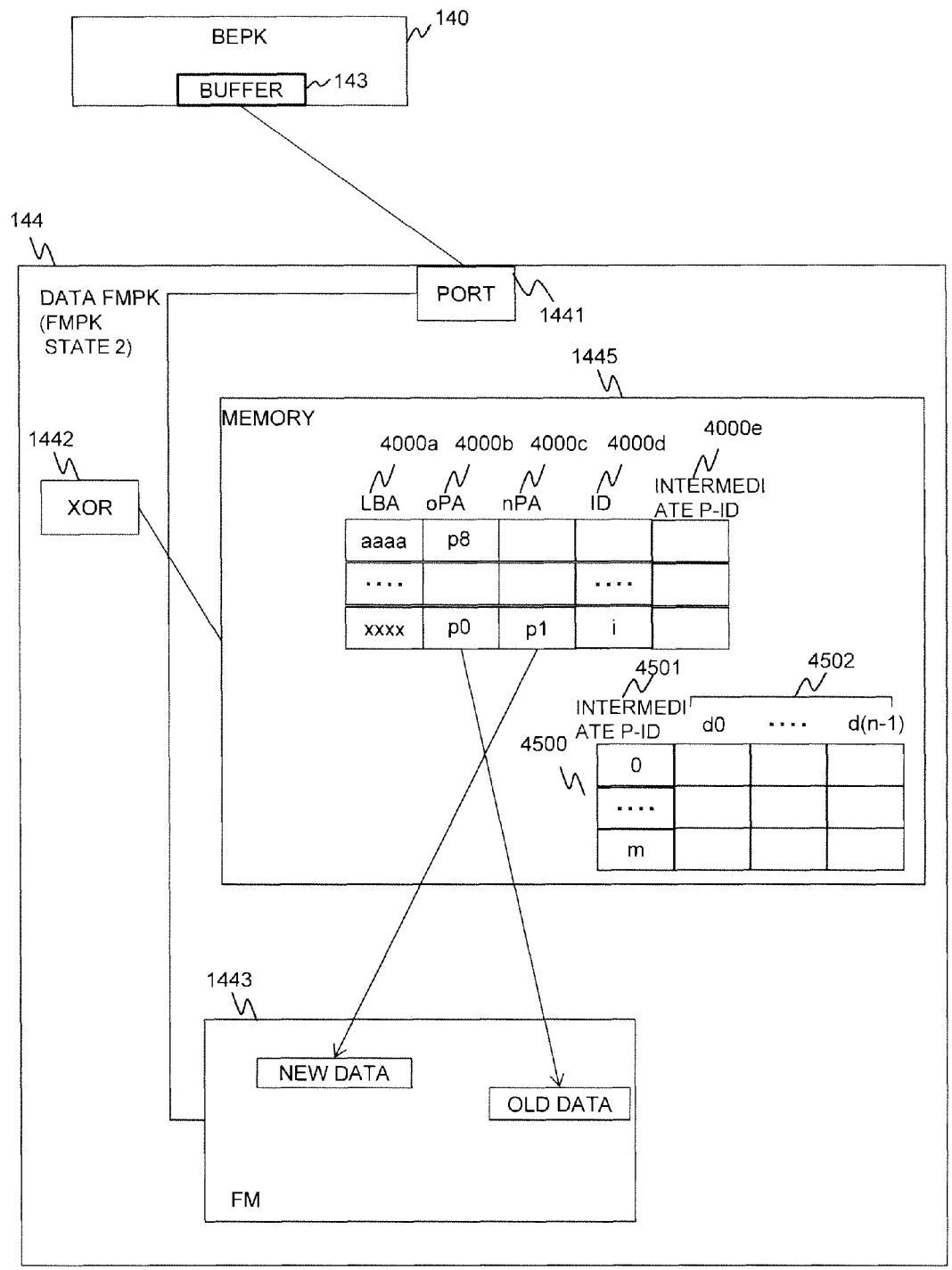
FIG. 16 illustrates a view showing the state after the FMPK receives a new data transmission command.

On the other hand, when a new data transmission command is received when the state of the FMPK 144 is in "state 1", the updated data (new data) is stored in the FM 1443, and the physical address in the FM 1443 storing the updated data is recorded in the nPA 4000c. FIG. 16 shows the state of the FMPK 144 after receiving the new data transmission command. The example of FIG. 16 illustrates an example where the data written by the new data transmission command is "new data", and the LBA of the access target area designated by the command parameter (area specified by LBA, data transmission length, and bitmap) is "xxxx".

As a result of storing new data, the physical address (p1) of the storage destination of "new data" is stored in nPa 4000c of the row where the LBA 4000a of the logical address management information 4000 is "xxxx". At this time, the physical address (p0) of the storage destination of "old data" which is a data before update of the new data still remains without being deleted from (the oPA 4000b of) the logical address management information 4000. As described, the state after having the new data transmission command received by the FMPK 144, that is, the state where old data and (physical address of) new data is mapped to a logical address, is referred to as "state 2".

What is meant by "state 2" is that the FMPK 144 has mapped the new data to the logical address, and it merely refers to a state where new data has been accepted as data for update. As mentioned earlier, when the FMPK 144 receives a read command (which is the same as the read command supported by a well-known HDD and the like), the FMPK 144 refers to the oPA 4000b mapped to the LBA 4000a, reads data from the physical address area specified by the oPA 4000b, and returns the data to the command transmission source. Therefore, if a read command is received when the state of the FMPK 144 is in "state 2", the data after update (new data) has been mapped to the logical address, but the data after update will not be returned, and data before update (data read from the physical address specified by the oPA 4000b) will be returned. Only after the FMPK 144 has accepted the new data commitment command, the controller 100 can read the data after update from the FMPK 144.

Figure 17:
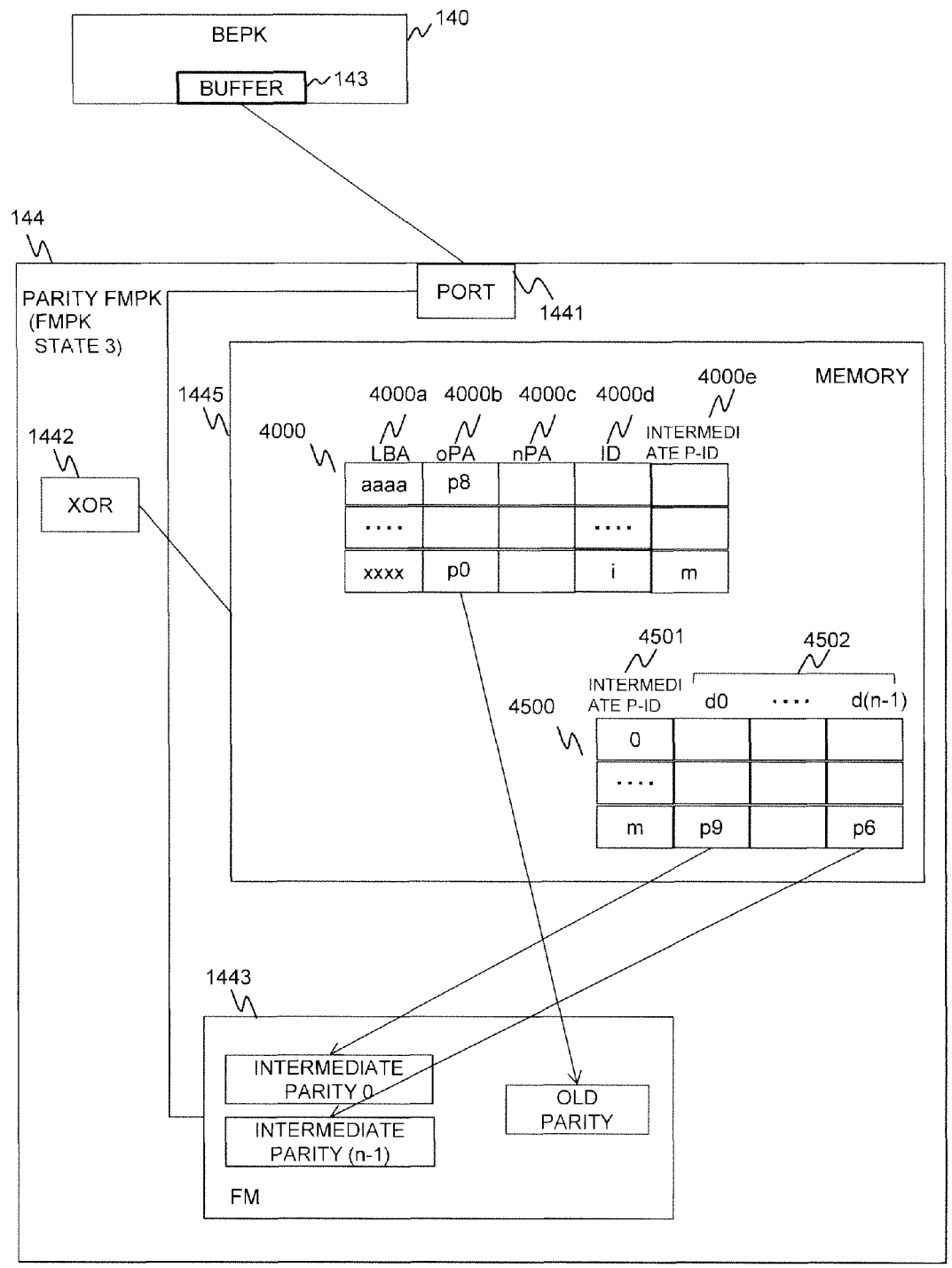
FIG. 17 is an explanatory view of an intermediate parity management table 4500 in the FMPK.

Next, an intermediate parity management table 4500 will be described with reference to FIG. 17. The intermediate parity management table 4500 is a table used when the FMPK 144 receives an intermediate parity transmission command. This table is a table storing the address in the area of the FM 1443 for storing the intermediate parity received together with the intermediate parity transmission command, and for storing the corresponding relationship between the intermediate parity and the parity before update. As shown in FIG. 17, a field 4501 and a field 4502 are provided in the intermediate parity management table 4500. The address within the area of the FM 1443 storing the intermediate parity is stored in the field 4502, and an identifier called an intermediate parity ID (intermediate P-ID) which is an identifier assigned to an intermediate parity stored in the area of the FM 1443 pointed by the address stored in the field 4502 is stored in the field 4501.

The parity of a parity stripe is normally computed from multiple data stripes. The relationship between the parity stripes and the data stripes will be described with reference to FIG. 4, taking a the stripe group 310 as an example. The parity stored in parity stripe (P2) is generated by computing the XOR of data stripes D(6), D(7) and D(8). Further according to the storage system 10 of the present embodiment, an intermediate parity is generated by the data FMPK, and the parity after update is generated in the parity FMPK by the generated intermediate parity and the parity before update, so that it is necessary to manage which parity stored in the parity FMPK (which LBA the parity before update is stored) the respective transmitted intermediate parities must update. Therefore, an intermediate P-ID 4501 is used to manage the corresponding relationship between the intermediate parity having been transmitted together with the intermediate parity transmission command and the parity before update stored in the parity FMPK.

When the parity FMPK receives an intermediate parity transmission command and an intermediate parity, it stores the address in the area of the FM 1443 storing the intermediate parity to the field 4502 of any of the rows in the intermediate parity management table 4500. FIG. 17 illustrates an example where the received intermediate parity is an intermediate parity used for updating the parity before update stored in the LBA "xxxx". The details will be described later, but when the FMPK 144 stores the intermediate parity in the FM 1443, it stores the stored physical address in any one of the rows of the intermediate parity management table 4500. FIG. 17 illustrates an example where the physical address storing the intermediate parity is recorded in the row where the value of the intermediate P-ID 4501 is m. In this case, the FMPK 144 records this value m also in the intermediate P-ID 4000e of the row where the LBA 4000a of the logical address management information 4000 is "xxxx". Thereby, the parity FMPK can manage the corresponding relationship between the address of the area storing the received intermediate parity and the address of the area storing the parity before update corresponding to that intermediate parity. Further, the state where an intermediate parity is stored in the FM 1443 within the FMPK 144 is referred to as "state 3".

When creating a parity after update, it is possible to use multiple intermediate parities to compute the parity after update. This process will be described with reference again to FIG. 4 illustrating an example of stripe groups. In the stripe group 310 of FIG. 4, in order to generate a parity after update of the parity stripe (P2), when only one of the data stripes D(6), D(7) and D(8) is updated, the parity after update should be generated from the parity before update and the intermediate parity generated from only one of the FMPKs having the data stripe updated (any one of 144-1, 144-3 or 144-4). However, it is possible that update has occurred to multiple data stripes out of data stripes D(6), D(7) and D(8), and in that case, multiple intermediate parities (a maximum of three intermediate parities in the case of FIG. 4) are used to generate the parity after update.

Therefore, multiple address storing fields (d0, d1, . . . d(n−1)) (note that n is the number of data stripes belonging to one stripe group) are provided to enable the same number of physical addresses as the number of data stripes belonging to one stripe group to be stored therein.

When storing a physical address of the area storing the intermediate parity to any one of the multiple address storage fields (d0, d1, . . . d(n−1)), the "data row number" designated as a command parameter of the intermediate parity transmission command is used. When the data row number is i (0≤i≤(n−1)), the physical address of the area storing the intermediate parity is stored in the address storing field di within the field 4502.

Further, as described in FIG. 17, when computing the parity after update, it is theoretically possible to generate the parity after update not by storing all the receive intermediate parity itself every time an intermediate parity is received, but by storing the new intermediate parity (hereinafter referred to as update intermediate parity) acquired by calculating the XOR of mutual intermediate parities having been received if an intermediate parity is received together with the intermediate parity transmission command.

We will refer to FIG. 4 again. When all data stripes D(6), D(7) and D(8) in the stripe group 310 of FIG. 4 have been updated, the three intermediate parities (hereinafter, these intermediate parities are referred to as mP1, mP2 and mP3) generated in all the FMPKs (144-1, 144-3, 144-4) having the data stripe updated are transmitted to the parity FMPK. Now, we will assume a case where a specification is adopted in which an update intermediate parity is generated and stored each time the parity FMPK receives an intermediate parity.

Further, we will assume the following case where:
(a) the MP 121 transmits mP1 together with an intermediate parity transmission command to the parity FMPK, and after a report notifying that the process has been normally completed is received from the parity FMPK (after the process of S4110 of FIG. 12 has been completed);
(b) the MP 121 further transmits mP2 to the parity FMPK, but immediately thereafter, a failure occurs to the MP 121 of the controller 100 and the destaging process (FIG. 11) is interrupted.

In this case, as mentioned earlier, the alternative MP takes over the destaging process, but since the controller 100 has not received a report that the transmission of the intermediate parity mP2 has been normally completed, it is not possible to determine whether the intermediate parity stored in the parity FMPK is mP1 or an exclusive OR (update intermediate parity) of mP1 and mP2.

Therefore, even if the alternative MP takes over the destaging process, it is not possible to determine whether only mP3 should be transmitted or both mP2 and mP3 should be transmitted to the parity FMPK. If the parity FMPK generates and stores an update intermediate parity each time it receives an intermediate parity, it may not be possible to perform the generation process of the parity after update due to the above reason.

On the other hand, according to the method for storing all the received intermediate parities as they are, as described in FIG. 17, there is an advantage in that the state of the parity FMPK can be set to a state enabling parity generation after update to be performed, by re-transmitting all the intermediate parities (mP1, mP2 and mP3) even when the process is interrupted at any step of the destaging process. Therefore, the storage system 10 according to the present embodiment adopts a method of storing all the received intermediate parities as they are every time an intermediate parity is received, and also storing the received intermediate parity with the parity before update and the data row number mapped thereto.

Figure 18:
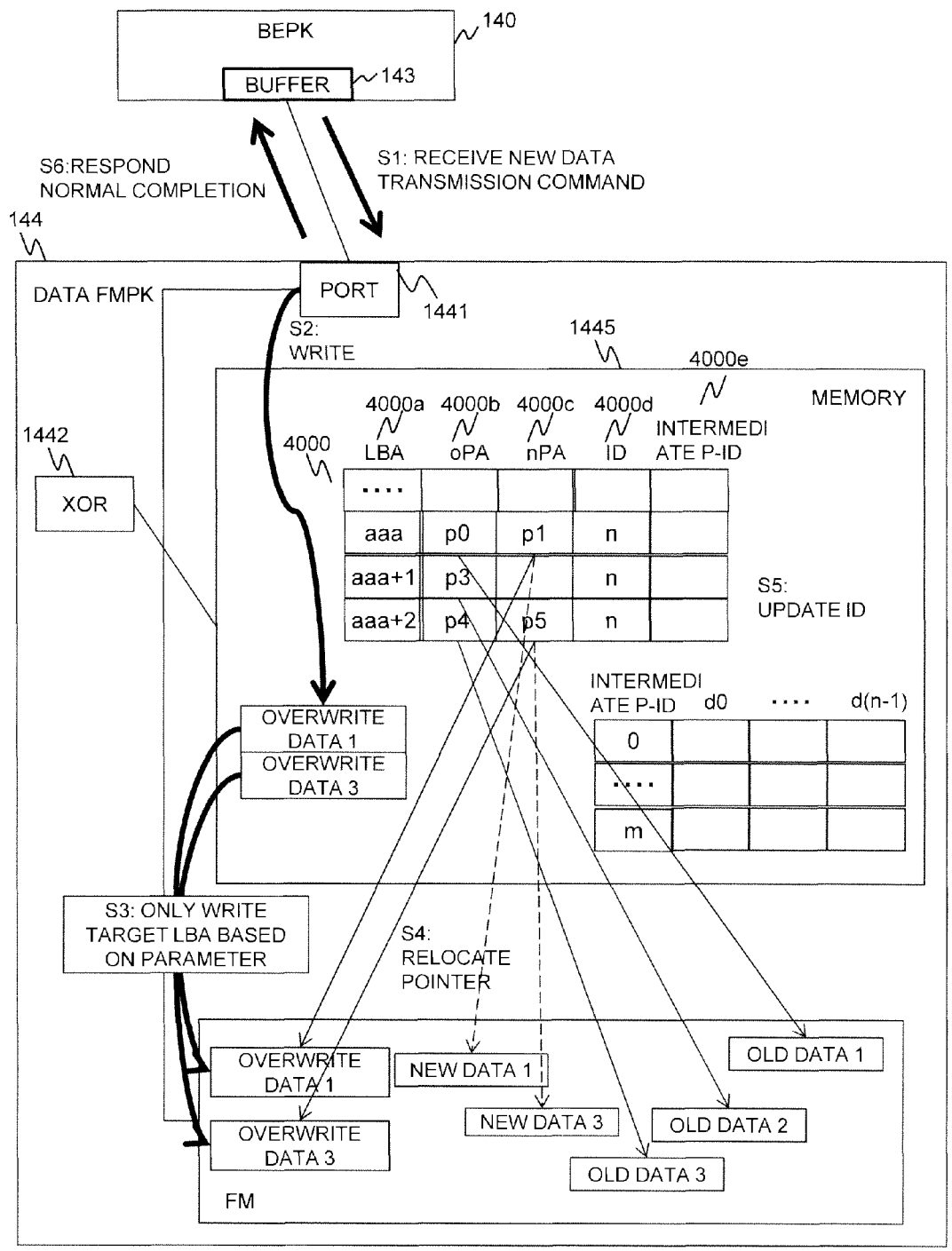
FIG. 18 is a view illustrating the flow of the process performed when the FMPK receives a new data transmission command.

Next, with reference to FIG. 18, the flow of the process performed when the FMPK 144 receives a new data transmission command will be described. FIG. 18 illustrates, as one example, a process designating, as command parameters, aaa as the initial LBA of the write target area, "1010 . . . (following bits are all 0)" as the bitmap, and "n" as the ID. At first, the CPU 1444 of the FMPK 144 receives a new data transmission command from the MP 121 via the BEPK 140 (S1), and analyzes the command parameters. As a result of analyzing the command parameters, especially the initial LBA and the bitmap included in the command parameters, the CPU 1444 determines that the received command is a new data transmission command to the data stored in an area where the LBA in the logical address space is aaa and aaa+2.Next, the CPU 1444 acquires data from the buffer 143 of the BEPK 140, and temporarily stores the same in the memory 1445 (S2).

Thereafter, the CPU 1444 allocates an unused area in the FM 1443. Here, it is temporarily assumed that area of physical addresses p1 and p5 in the FM 1443 have been allocated as areas where the LBA stores new data stored in aaa and aaa+2.Then, the data stored in the memory 1445 is stored in the FM 1443 (S3) and the contents of the nPA 4000c of the logical address management information 4000 are updated (S4). In the example of FIG. 18, values "p1" and "p5" are stored in the nPA 4000c regarding the rows where the LBA 4000a is "aaa" and "aaa+2" in the logical address management information 4000.

Thereafter, the CPU 1444 stores value n designated as the command parameter to the ID 4000d (S5). Lastly, the FMPK 144 notifies the MP 121 that the process of the new data transmission command has been completed normally (S6), and ends the process. Thereby, new data having been transmitted will be mapped to the areas of addresses (LBAs) "aaa" and "aaa+2" in the logical address space. Further, the data before update is also mapped to the areas of addresses (LBAs) "aaa" and "aaa+2" in the logical address space (the physical addresses of the data before update are recorded in the oPA 4000b).

In the process of S4, the content of the nPA 4000c is updated without any conditions. Therefore, when new data transmission commands are received for multiple times (such as twice), as shown in FIG. 18, only the address of the area storing the data ("overwrite data 1" and "overwrite data 3" in the drawing) arriving together with the new data transmission command that has been received at the second time will be stored. Therefore, the data transmitted by the first new data transmission command (new data 1 and 3 in the drawing) actually becomes a cancelled (invalidated) data.

Figure 19:
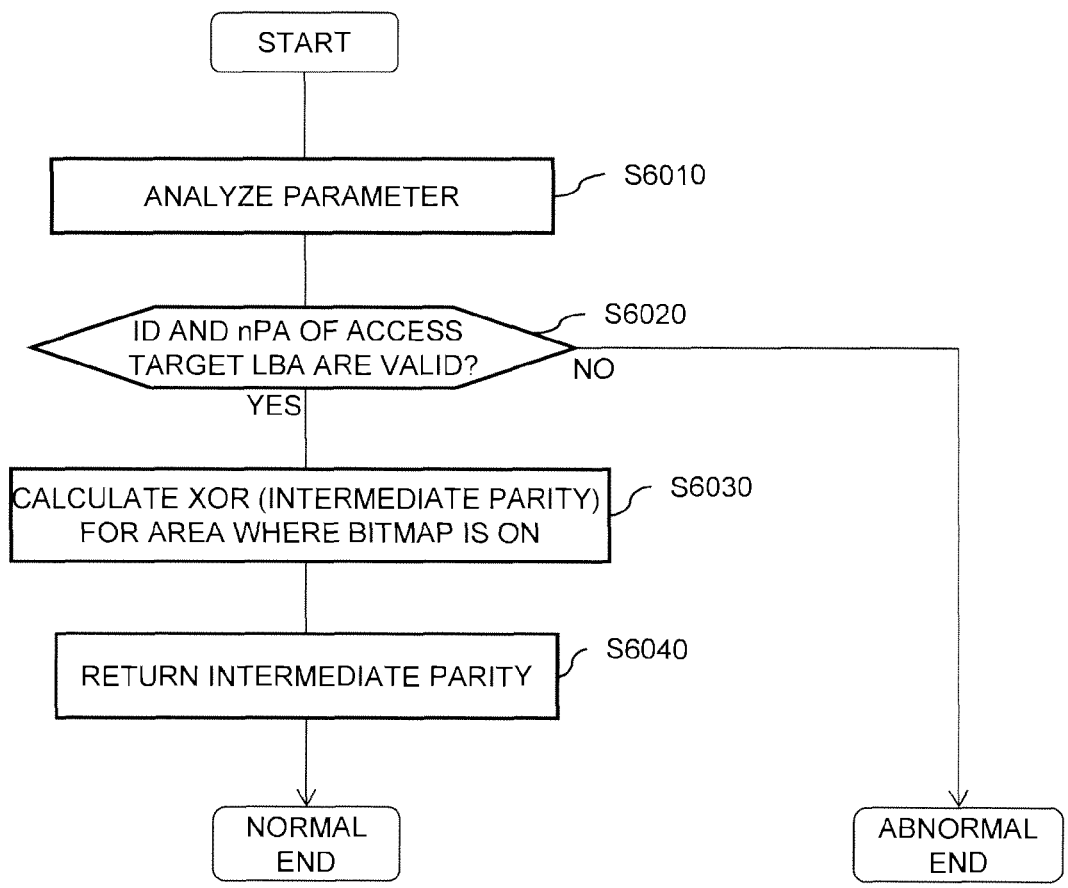
FIG. 19 is a view illustrating a flow of the process performed when the FMPK 144 receives an intermediate parity reception command.

When the new data transmission command is received and the state of the FMPK 144 becomes "state 2", the FMPK 144 will be able to create the intermediate parity. Using FIG. 19, we will describe the flow of the process performed when the FMPK 144 receives an intermediate parity reception command.

When the CPU 1444 of the FMPK receives an intermediate parity reception command, it analyzes the command parameters and determines the LBAs in the logical address space which are the current processing target (hereinafter referred to as access target LBAs) (S6010). It receives the initial address (LBA) of the access target area, the data transmission length and the bitmap as the command parameters, wherein the targets of receiving the intermediate parity of the command transmission source (that is, the MP 121) are the area where the bitmap is set to 1 (ON) out of the areas in the range designated by the initial address (LBA) and the data transmission length. Therefore, the CPU specifies LBAs of the areas where the bitmap is set to 1 (ON). An example is described where aaa is designated as the start address and "1010 . . . (following bits are all 0)" is designated as the bitmap in the command parameters. Since the initial bit and the third bit from the initial bit are set to ON in the bitmap, it is determined that LBAs aaa and aaa+2 are the access target LBAs.

Thereafter, the CPU 1444 refers to the logical address management information 4000, and determines, in the rows where the values in the LBA 4000a are the same as the LBAs determined in S6010, whether;

(1) the ID 4000d is equal to the ID designated by the command parameters; and (2) a valid value (value that is not NULL) is stored in the nPA 4000c (S6020).

The value stored in the ID 4000d is a value stored when the new data transmission command has been received, and based thereon, the CPU 1444 determines whether the currently received intermediate parity reception command is related to a new data transmission command received previously. Also, if a valid value is not stored in the nPA 4000c,it means that new data is not stored in the FMPK 144, and an intermediate parity cannot be generated in this state, so that such determination is performed.

When LBAs exist that do not satisfy the above-described condition (1) or (2) (S6020: N), the FMPK 144 returns an error to the MP 121 being the command transmission source, and ends the process. If all the LBAs determined in S6010 satisfy the above-described conditions (1) and (2) (S6020: Yes), the FMPK 144 executes the process of S6030.

In S6030, intermediate parity is calculated for the respective areas of the (one or more) LBAs determined in S6010. The CPU 1444 reads the data before update (oD) and the data after update (nD) by referring to the values stored in the oPA 4000b and the nPA 4000c of the logical address management information 4000. Then, it uses a logical operation circuit 1442 to compute the exclusive OR (intermediate parity) mP of oD and nD. The calculated mP is temporarily stored in the memory 1445. Finally, the computed intermediate parity is stored in the storage destination address (the address in the buffer 143 of the BE I/F 141) being designated by the parameters (S6040), and the process of the intermediate parity reception command is completed.

Next, the flow of the process performed by the FMPK 144 when an intermediate parity transmission command is received will be described with reference to FIG. 20.

When the CPU 1444 of the FMPK receives an intermediate parity transmission command, it analyzes the command parameters, and determines the LBAs in the logical address space being the current processing target (hereinafter referred to as access target LBAs) (S7010). This process is similar to the process of S6010.

Next, the CPU 1444 performs a determination of the validity of the ID designated by the command parameters (S7020). In the process of S7020, the CPU refers to the logical address management information 4000, and determines, regarding all the rows where the values of the LBA 4000a are equal to the (one or more) LBAs determined in S7010, whether:

(1) the ID 4000d is NULL or not; and (2) the ID 4000d is equal to the ID designated by the command parameters.

In the determination of S7020, if a row exists that do not correspond to either (1) or (2) (S7020: No), the CPU 1444 returns an error to the MP 121 which is the command transmission source, and ends the process. On the other hand, if all the rows correspond to either one of (1) or (2) (S7020: Yes), the CPU 1444 executes the process of S7030 and thereafter.

In S7030, the CPU 1444 receives data (intermediate parity) from the buffer 143, and temporarily stores the same in the memory 1445.

Next, the processes of S7040 through S7100 are executed for the respective access target LBAs specified in S7010. At first, in S7040, the CPU 1444 selects an LBA where the processes of S7040 through S7100 are not yet performed out of the respective access target LBAs specified in S7010. Hereafter, the LBA selected in S7040 is referred to as a "target address".

In S7050, the CPU 1444 refers to the logical address management information 4000, and determines whether a valid value (non-NULL value) is stored in the intermediate P-ID 4000e of the row having a target address equal to the value of the LBA 4000a. If a valid value is not stored (S7050: NO), the CPU 1444 executes the process of S7060. If a valid value is stored (S7050: Yes), the CPU 1444 will not perform the process of S7060, and advances to S7070. If a valid value is stored in the intermediate P-ID 4000e (the value of which is temporarily set to k), the row where the value of the intermediate P-ID 4501 is k in the intermediate parity management table 4500 is referred to as a "selected row of the intermediate parity management table 4500".

In S7060, the CPU 1444 selects one intermediate P-ID 4501 of the row that is not yet used in the intermediate parity management table 4500 (the row of the intermediate parity management table 4500 selected here is referred to as a "selected row of the intermediate parity management table 4500"), and stores the value of the selected intermediate P-ID 4501 to the intermediate P-ID 4000e of the row having a target address equal to the value of the LBA 4000a in the logical address management information 4000.

In S7070, the CPU 1444 allocates an area for storing the intermediate parity in the FM 1443. Thereafter, in S7080, the CPU 1444 stores the intermediate parity corresponding to the target address out of the intermediate parities temporarily stored in the memory 1445 to the area in the FM 1443 allocated in S7070, and in S7090, stores the physical address of the area storing the intermediate parity in the row designated by the command parameter (data row number) from the multiple fields 4502 of the selected row of the intermediate parity management table 4500. The process of S7090, that is, the details of the method for selecting a storage destination of the physical address information of the area storing the intermediate parity, will be described later.

In S7100, the CPU 1444 determines whether the processes to S7090 have been performed for all access target LBAs. When the process is not completed for all access target LBAs (S7100: NO), it returns to S7040, and repeats the processes of S7040 and thereafter. When processes are completed for all access target LBAs (S7100: YES), the CPU 1444 stores the IDs designated by the parameter in the intermediate parity transmission commands to the ID 4000d corresponding to all access target LBAs (S7110), and ends the process.

Figure 21:
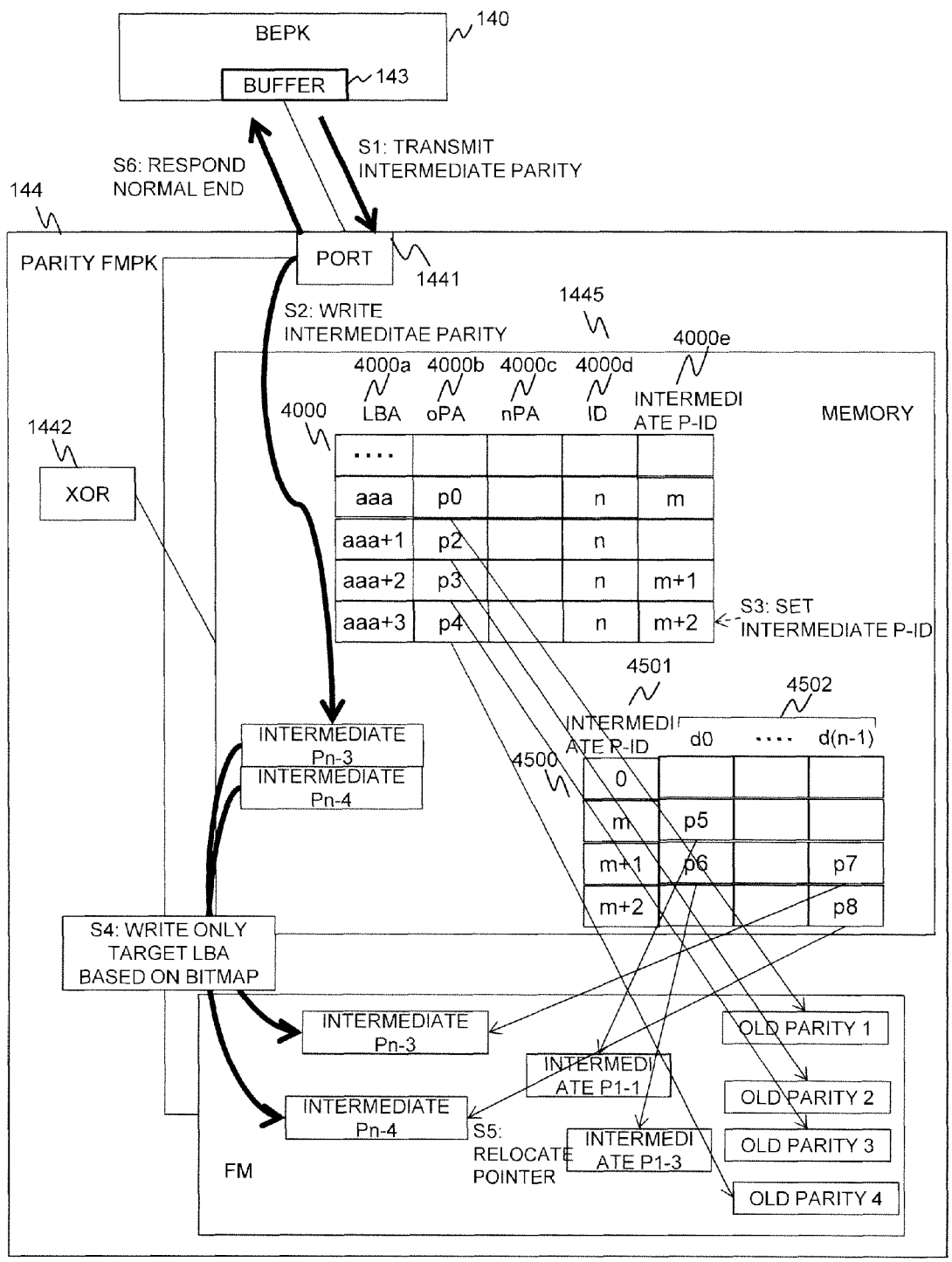
FIG. 21 is a view illustrating a flow of data within the FMPK 144 having received the intermediate parity transmission command.

For reference, the flow of data in the FMPK 144 having received the intermediate parity transmission command, or the example of change of management information (the logical address management information 4000 and the intermediate parity management table 4500) will be described with reference to FIG. 21. FIG. 21 illustrates an example of a case where the access target LBAs designated by the parameters of the intermediate parity transmission command are "aaa+2" and "aaa+3", and where intermediate Pn-3 and intermediate Pn-4 have been transmitted to the respective LBAs. Further, it is assumed that (n−1) has been designated as the data row number (parameter).

Prior to receiving the intermediate parity transmission command, an intermediate P1-1 is mapped to LBA "aaa" and intermediate P1-3 is mapped to LBA "aaa+2". In this case, when the parity FMPK receives an intermediate parity (intermediate Pn-3 and intermediate Pn-4), at first, the access target LBA maps the intermediate parity to the area of "aaa+2". As for the area where the LBA is "aaa+2", since "m+1" is set to the intermediate P-ID 4000e of the logical address management information 4000 (it is determined that a valid value is stored in the determination process of S7050 of FIG. 20), the FMPK 144 allocates an area within the FM 1443 (assuming that the physical address is p7), and stores the intermediate Pn-3 to the allocated area (corresponding to S7070 and S7080 of FIG. 20). Since (n−1) is designated as the data row number (parameter), a physical address p7 of an intermediate Pn-3 is stored in the field 4502d (n−1) out of the multiple fields 4502 (d0 . . . d(n−1)) of the rows where the intermediate P-ID 4501 is set to (m+1) in the intermediate parity management table 4500 (corresponding to S7090 of FIG. 20).

Figure 20:
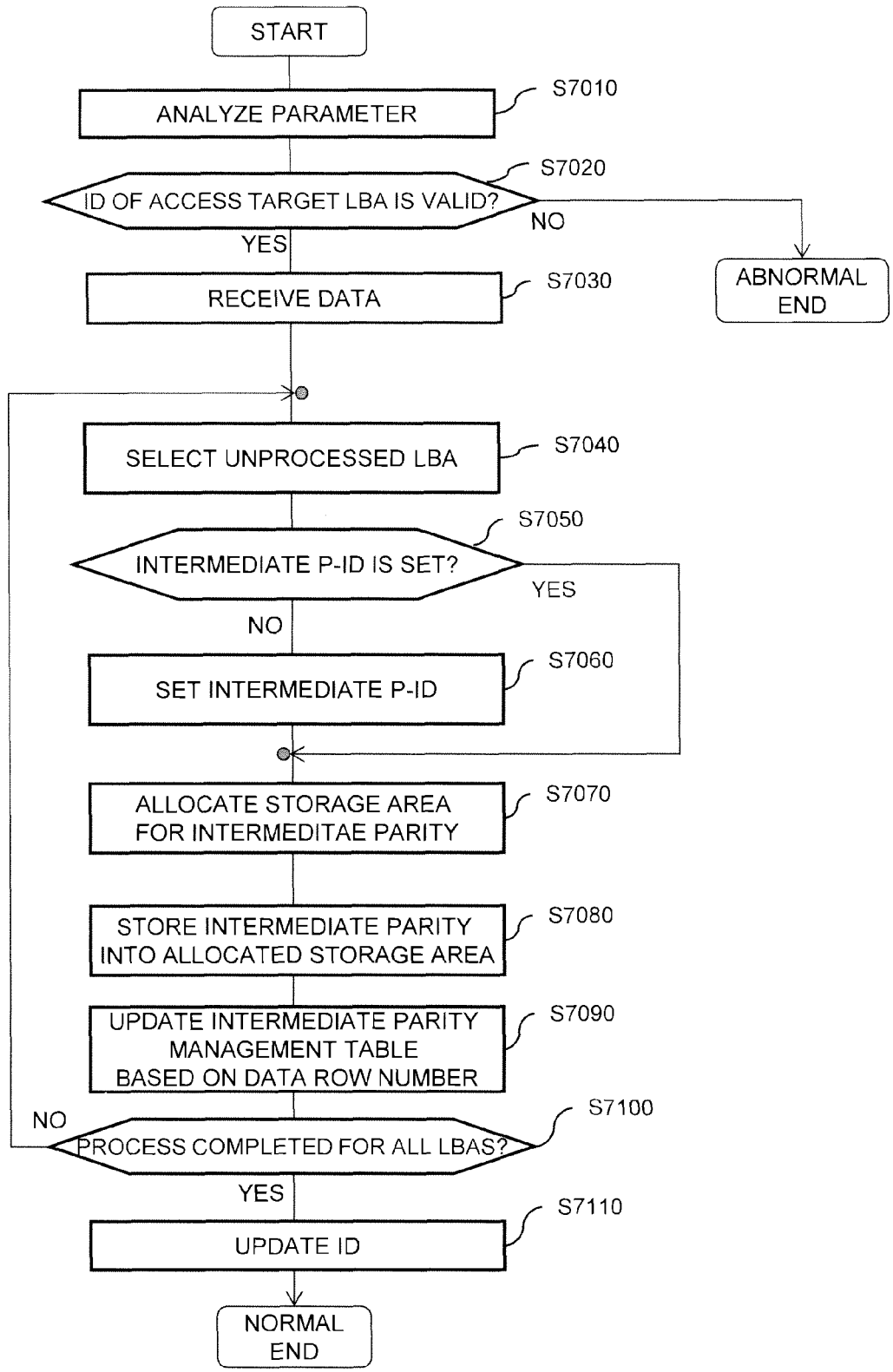
FIG. 20 is a view illustrating a flow of the process performed when the FMPK 144 receives an intermediate parity transmission command.

When the LBA maps an intermediate parity to the area of "aaa+3", since the intermediate P-ID 4000e of the logical address management information 4000 is not yet set (determined that a valid value is not stored in the determination process of S7050 of FIG. 20), the FMPK 144 selects one intermediate P-ID 4501 of an unused rows in the intermediate parity management table 4500 (here, it is assumed that "m+2" is selected), and the LBA 4000a of the logical address management information 4000 stores (m+2) in the intermediate P-ID 4000e in the row where the LBA 4000a is "aaa+3" (corresponding to S7060 of FIG. 20). Then, after the FMPK 144 allocates an area within the FM 1443 (assuming that the physical address is p8), it stores the intermediate Pn-4 to the allocated area (corresponding to S7070 and S7080 of FIG. 20), then stores the physical address p8 f the intermediate Pn-4 in the field 4502d (n−1) of the row where the intermediate P-ID 4501 is (m+2) in the intermediate parity management table 4500 (corresponding to S7090 of FIG. 20).

FIG. 21 illustrates an example where an intermediate parity transmission command storing an intermediate parity of data row number (n−1) is received by the FMPMK 144 where the intermediate parity of data row number (n−1) is not yet stored. However, it may be possible that an intermediate parity transmission command is transmitted to the FMPK 144 having an intermediate parity already stored therein. Such case may occur when the destaging process is interrupted in midway (such as when processing S3060 of FIG. 11) due to failure of the MP 121 or the like, and the alternative MP starts over the destaging process again after recovering from failure.

A case is taken as an example where an intermediate parity transmission command is received designating "aaa+2" and "aaa+3" as the access target LBA and (n−1) as the data row number (parameter), when the state of the parity FMPK is in a state as shown in FIG. 21 (intermediate Pn-3 and intermediate Pn-4 are already stored). In this case, when the process of FIG. 20 is performed, in S7090, the CPU 144 stores the physical address of the area storing the intermediate parity (temporarily, it is assumed that the physical addresses of the area are p9 and p10) in the row (field 4502*d* (n−1)) designated by the command parameter (data row number) out of the multiple fields 4502 of the selected row (rows where the intermediate P-ID is (m+2)) of the intermediate parity management table 4500.

Therefore, the information of the already stored physical addresses (p7, p8) are updated to new address information p9 and p10. That is, when an intermediate parity has been stored in the past by an intermediate parity transmission command designating the same address and the same data row number as command parameters, the address information of the intermediate parity having been stored in the past is overwritten, and the intermediate parity having been stored in the past actually becomes a cancelled (invalid) data.

Next, we will describe the new data commitment command. The new data commitment command is a command that is transmitted to both the data FMPK and the parity FMPK. When the data FMPK receives a new data commitment command, the new data stored in the FM 1443 is committed as an formal data. Actually, a process is performed to substitute the address stored in the nPA 4000*c* of the logical address management information 4000 (address of the area storing the new data) to oPA 4000*b* (field storing the address of the area storing the old data). On the other hand, when the parity FMPK receives a new data commitment command, a parity after update is generated by the parity before update and the intermediate parity stored in the parity FMPK, to commit the parity after update as the formal parity.

Figure 22:
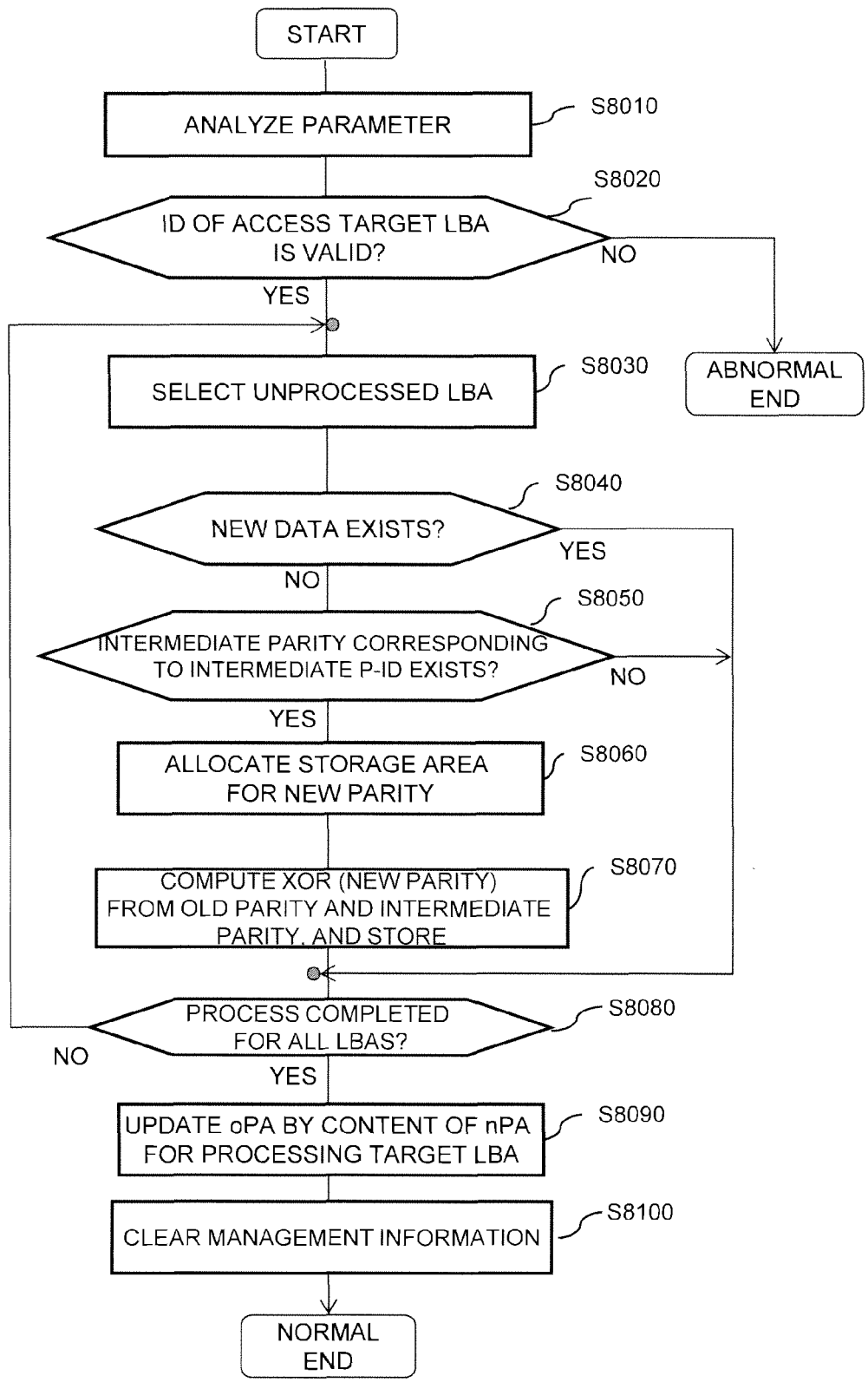
FIG. 22 is a view illustrating a flow of the process performed when the FMPK 144 receives a new data commitment command.

The flow of the process performed by the FMPK 144 when a new data commitment command has been received will be described with reference to FIG. 22. At first, when the CPU 1444 of the FMPK receives a new data commitment command, it analyzes the command parameters, and determines the LBA in the logical address space being the current processing target (hereinafter, this LBA is referred to as an access target LBA) (S8010). This process is similar to S6010 and S7010.

Next, the CPU 1444 determines the validity of the ID designated by the command parameter (S8020). In the process of S8020, the CPU refers to the logical address management information 4000, and regarding all the rows where the value of LBA 4000*a* is equal to the (multiple) LBAs determined in S8010, the CPU determines whether:

(1) ID 4000*d* is NULL or not; and (2) ID 4000*d* is equal to the ID designated by the command parameter or not.

In the determination of S8020, if a row that does not correspond to either (1) or (2) exists, the CPU 1444 returns an error to the MP 121 being the command transmission source, and ends the process. On the other hand, if all the rows correspond to either one of (1) or (2), the CPU 1444 executes the processes of S8030 and thereafter.

Next, we will execute the processes of S8030 through S8080 for the respective access target LBAs specified in S8010. At first, an LBA not yet subjected to the processes of S8030 through S8080 is selected from the respective access target LBAs specified in S8010. Hereafter, the LBA selected in S8030 is referred to as a "target address".

In S8040, the CPU 144 determines whether new data corresponding to the target address is stored or not. Actually, the CPU refers to the nPA 4000*c* of the row where the value of LBA 4000*a* is equal to the target address within the logical address management information 4000, and determines whether the nPA 4000*c* is NULL or not. When the nPA 4000*c* is NULL (S8040: NO), it means that new data is not stored, so that the procedure advances to a new parity generation process of S8050 and thereafter. When the nPA 4000*c* is not NULL, it means that new data is stored (S8040: YES). In that case, it means that the target address is an address corresponding to the data stripe (the FMPK 144 performing the process is a data FMPK), and so the procedure advances to S8080 since there is no need to perform the parity generation process.

In S8050, the CPU 144 determines whether an intermediate parity corresponding to the target address is recorded or not. Actually, it refers to the intermediate P-ID 4000*e* of the row having a value of the LBA 4000*a* within the logical address management information 4000 equal to the target address. Then, the CPU determines whether a valid value (non-NULL value) is stored in the field 4502 of the row where the intermediate P-ID 4000*e* is equal to the intermediate P-ID 4501 of the intermediate parity management table 4500. If a value is stored in one or more rows (d0 through d(n−1)) within the field 4502 (S8050: YES), the procedure advances to S8060. When the values of all rows (d0 through d(n−1)) within the field 4502 are NULL (S8050: NO), the procedure advances to S8080.

In S8060, the CPU 144 allocates an area for storing the new parity within the FM 1443, and updates the nPA 4000*c* by the physical address of the allocated area. Next, in S8070, a new parity is generated. During generation of a new parity, a physical address of the area storing the old parity corresponding to the target address (stored in the oPA 4000*b*) is acquired from the logical address management information 4000, and a physical address of the area storing the intermediate parity (stored in the respective rows in the field 4502) is acquired from the intermediate parity management table 4500. There may be multiple intermediate parities stored, so that all the non-NULL physical addresses are acquired from the values (physical addresses) stored in the respective rows within the field 4502. Thereafter, old parities and intermediate parities are read from the acquired physical addresses, XOR thereof is calculated using a logical operation circuit 1442, and the computed result is stored in an area for a new parity allocated in S8060.

In S8080, the CPU 1444 determines whether the processes up to S8070 have been performed for all access target LBAs. When all target LBAs have been processed (S8080: YES), the procedure advances to S8090, but if not all access target LBAs have not been processed (S8080: No), the procedure returns to S8030, and repeats the processes of S8030 and thereafter.

In S8090, the contents of the oPA 4000*b* of the logical address management information 4000 are updated by the value stored in the nPA 4000*c* for all access target LBAs. Thereby, the areas having been handled as new data or new parity are handled as formal data or parity (old data or old parity).

Further, when executing S8090, it may be possible that the value of nPA 4000*c* is NULL, and in that case, no operation is performed. A case where the value of the nPA 4000*c* is NULL may occur when a new data commitment command is received when the state of the FMPK 144 is "state 1". In that case, the FMPK 144 according to the present embodiment returns a response notifying that the procedure is ended normally to the command transmission source (MP 121).

In S8100, the CPU 1444 clears the management information. Here, the CPU clears the contents of the nPA 4000*c*, the ID 4000*d* and the intermediate P-ID 4000*e* for all the rows where the value of the LBA 4000*a* of the logical address management information 4000 is equal to the addresses of the current processing target (a NULL value is entered). Further, if a non-NULL value is stored in the intermediate P-ID 4000*e*,a NULL value is stored in the respective rows (d0 through d(n−1)) of the field 4502 where the intermediate P-ID 4501 of the intermediate parity management table 4500 is equal to the intermediate P-ID 4000*e*.When the process of S8011 has been completed, the CPU 1444 returns a response that the new data commitment command has been completed normally to the command transmission source, and ends the process.

Figure 23:
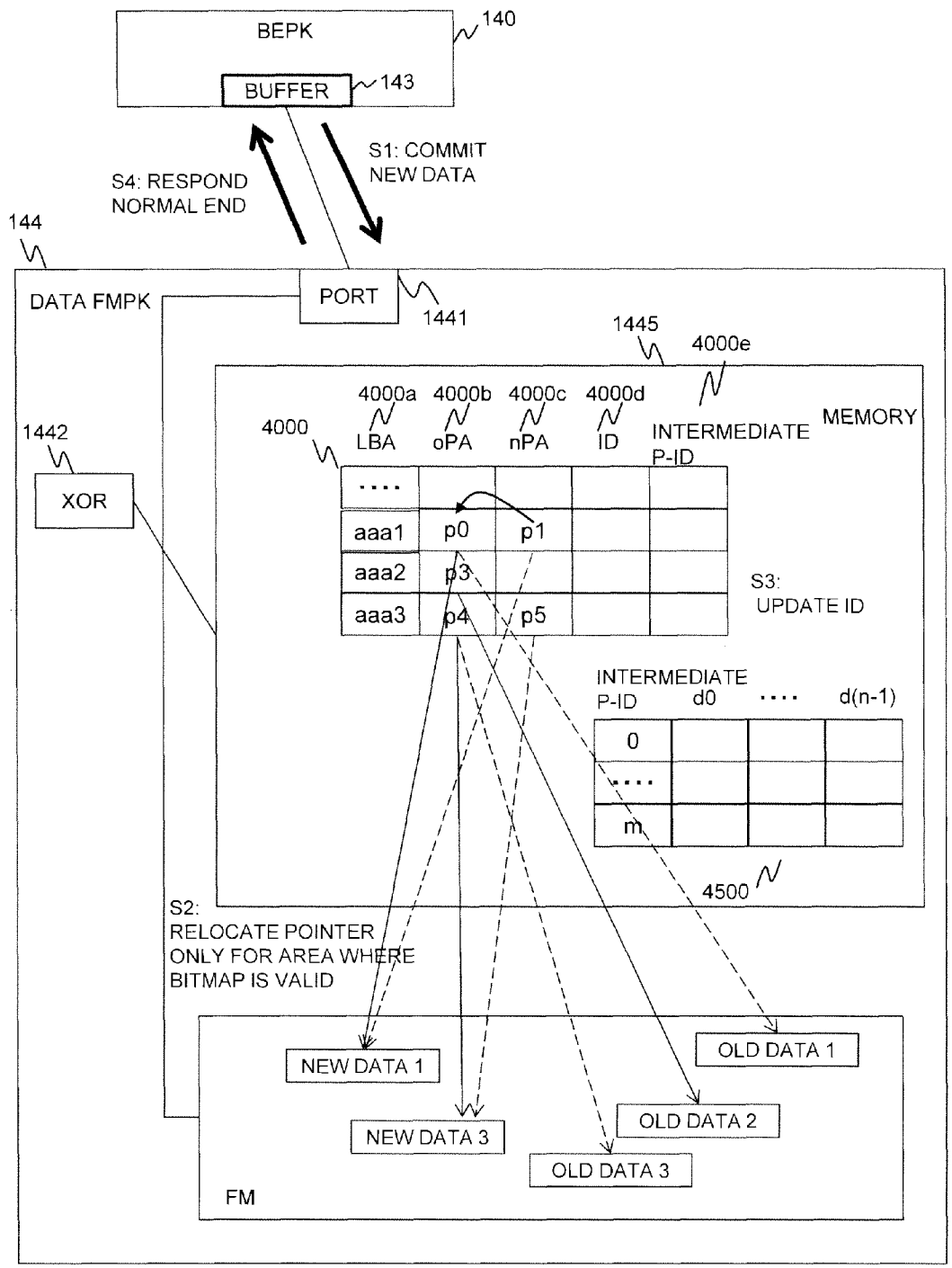
FIG. 23 is a view illustrating the change of state within the FMPK when the data FMPK receives a new data commitment command.

For reference, we will describe the flow of data when the FMPK 144 receives a new data commitment command, and the change of management information (logical address management information 4000, and intermediate parity management table 4500), with reference to FIGS. 23 through 27. FIG. 23 illustrates an example of a case where the data FMPK receives a new data commitment command. Further, FIG. 23 illustrates an example where the access target LBA designated by the command (parameter) is "aaa1" and "aaa3". In the drawings, the solid line arrows and the dotted line arrows from the oPA and nPA as management information pointing to the storage areas in the FM 1443 show that the physical addresses stored in oPA and nPA point to the storage areas in the FM 1443. The dotted line arrows show the state before reception of the new data commitment command, and the solid line shows the state after reception of the new data commitment command.

Before receiving the new data commitment command, the FMPK 144 has new data 1 and new data 3 respectively managed as new data (nPA) mapped to LBA "aaa1" and "aaa3". At this time, the physical addresses p1 and p5 of the areas storing new data 1 and new data 3 are stored in the nPA 4000*c* of the logical address management information 4000. When the FMPK 144 receives the reception of new data commitment command and performs processes, the oPA 4000*b* mapped to LBA "aaa1" and "aaa3" are updated by the values (p1, p5) stored in the nPA 4000*c*,and the new data 1 and new data 3 are managed as new data (nPA) mapped to LBA "aaa1" and "aaa3". Hereafter, when a read command to LBA "aaa1" or "aaa3" is received from the MP 121, the FMPK 144 returns new data 1 or new data 3 instead of old data 1 or old data 3.

FIGS. 24 through 27 illustrate a case where the parity FMPK receives a new data commitment command. It illustrates an example where the access target LBAs designated by the command (parameter) are "aaa", "aaa+2" and "aaa+3".

Figure 24:
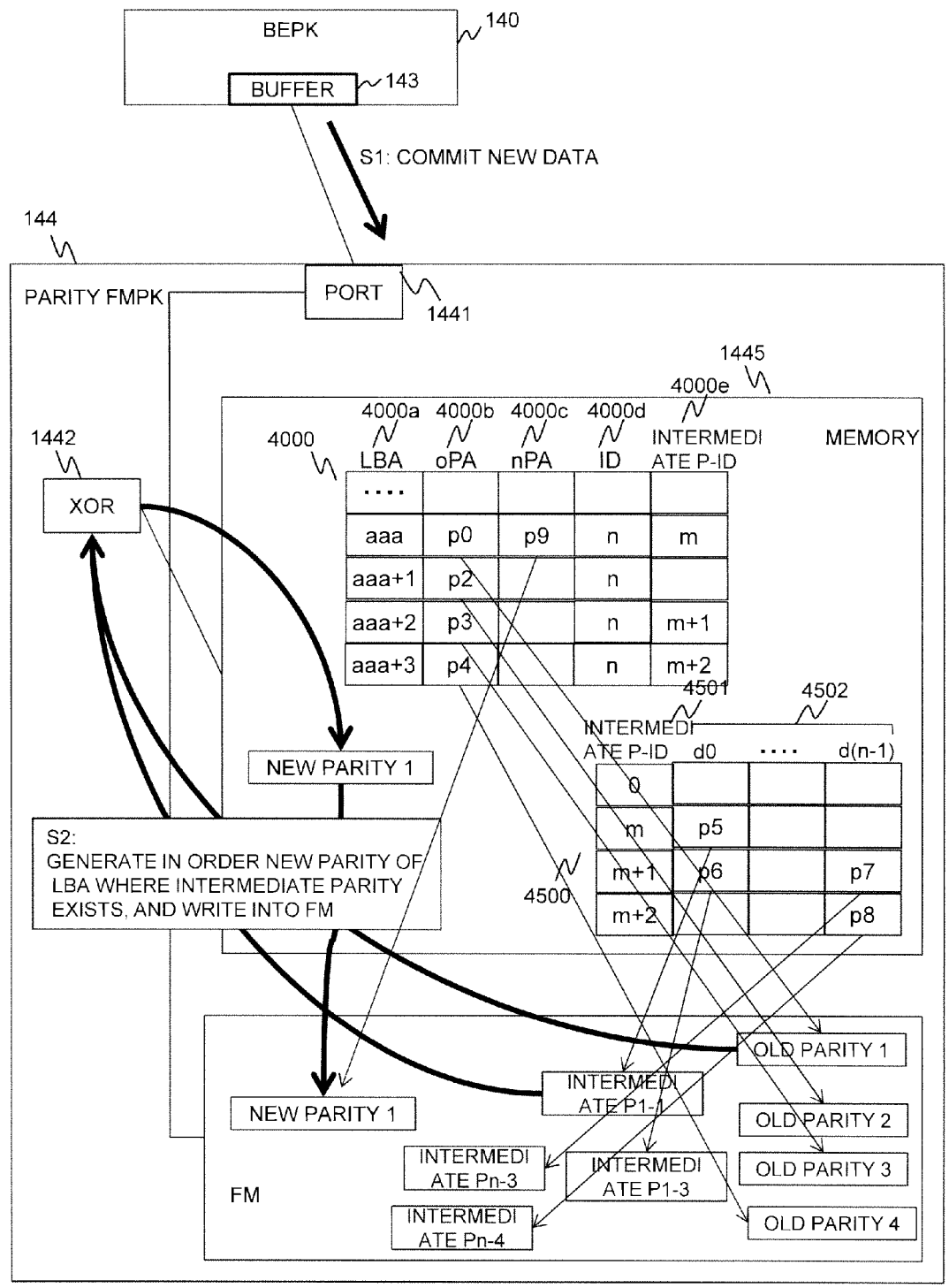
FIG. 24 is a (first) view showing the change of state within the FMPK when the parity FMPK receives a new data commitment command.

When the parity FMPK receives a new data commitment command, it first performs parity generation to the area where the access target LBA is "aaa" (FIG. 24). The area where the LBA is "aaa" has an old parity 1 stored in physical address p0 mapped thereto (this mapping is stored in the logical address management information 4000). Further, the logical address management information 4000 and the intermediate parity management table 4500 store information showing that "intermediate P1-1" is mapped as an intermediate parity corresponding to the area where the LBA is "aaa". In this case, the parity FMPK reads the old parity 1 and the intermediate P1-1 corresponding to old parity 1, generates a new parity 1,and stores the generated new parity 1 in the FM 1443.

Figure 25:
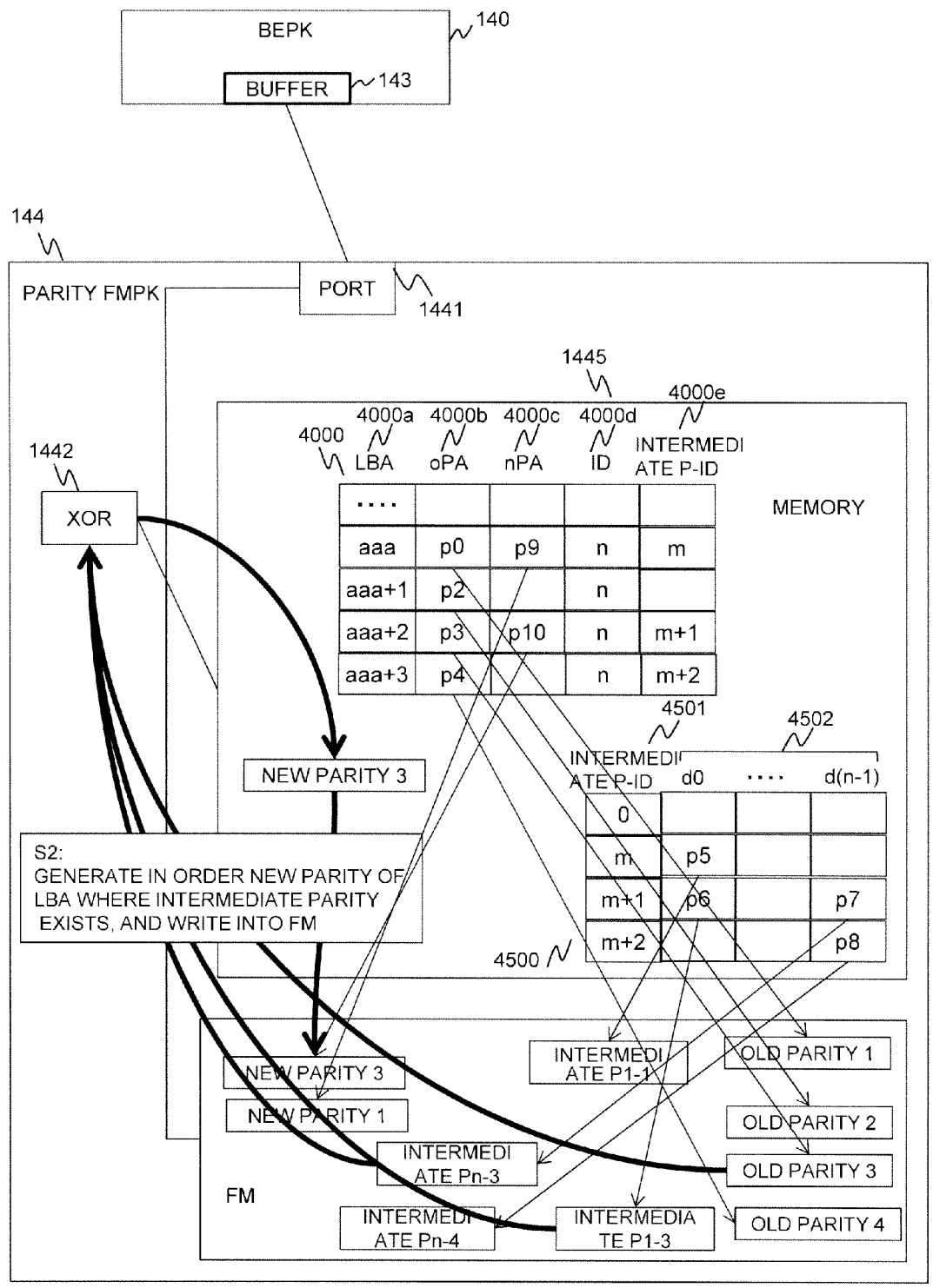
FIG. 25 is a (second) view showing the change of state within the FMPK when the parity FMPK receives a new data commitment command.

FIG. 25 shows a state where parity generation is performed to an area where the access target LBA is "aaa+2". By referring to the logical address management information 4000 and the intermediate parity management table 4500, an old parity 3 stored in physical address p3 is mapped to the area where the LBA is "aaa+2", and "intermediate P1-3" and "intermediate Pn-3" are mapped as intermediate parities. In this case, the parity FMPK reads the old parity 3, the intermediate P1-3 and the intermediate Pn-3, and generates a new parity 3. The generated new parity 3 is stored in the FM 1443.

Figure 26:
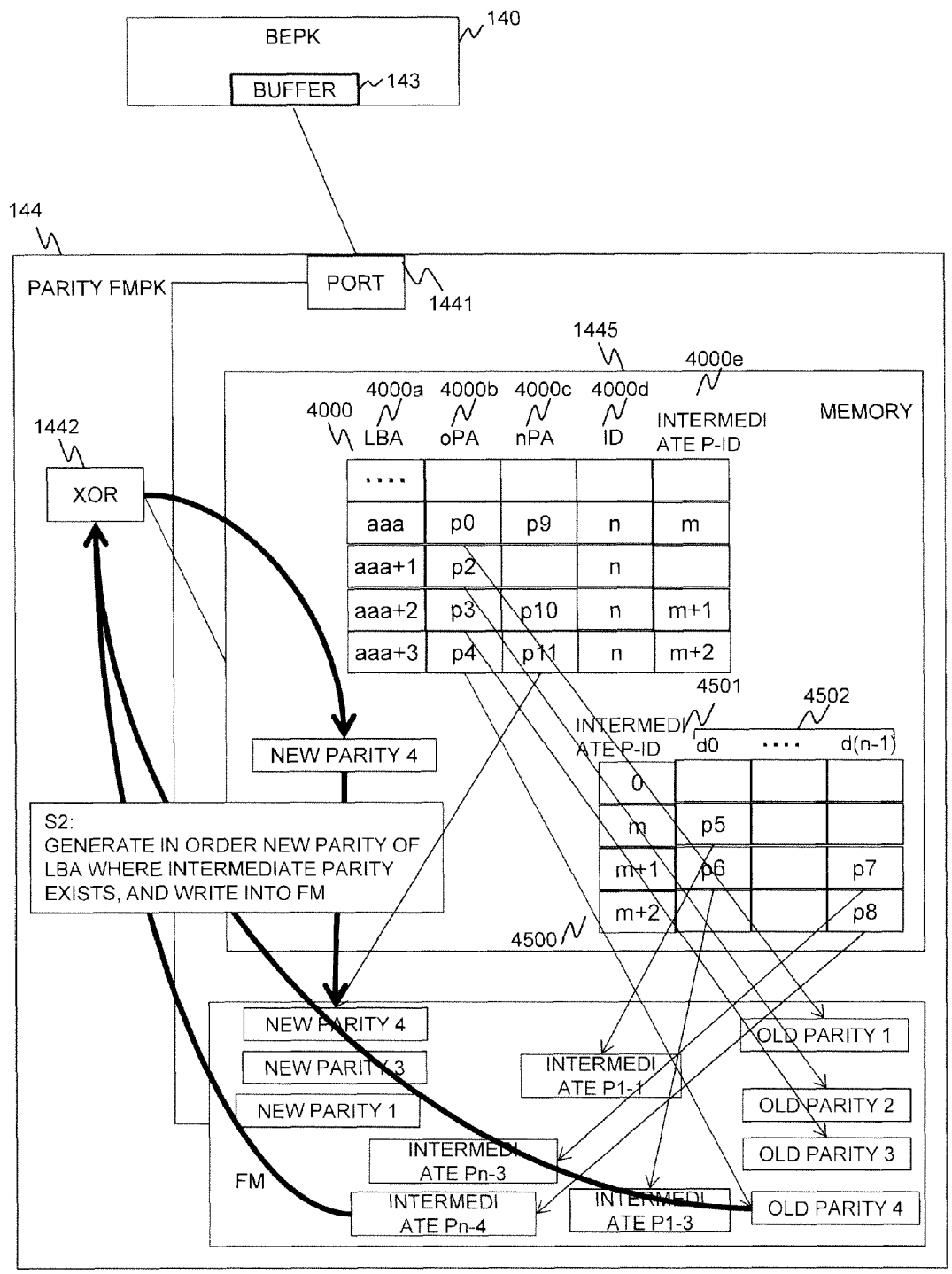
FIG. 26 is a (third) view showing the change of state within the FMPK when the parity FMPK receives a new data commitment command.

FIG. 26 illustrates a state where parity generation is performed to the area where the access target LBA is "aaa+3". By referring to the logical address management information 4000 and the intermediate parity management table 4500, an old parity 4 stored in physical address p4 is mapped to the area where the LBA is "aaa+3", and "intermediate Pn-4" is mapped as intermediate parity. In this case, the parity FMPK reads the old parity 4 and the intermediate Pn-4, and generates a new parity 4. The generated new parity 4 is stored in the FM 1443.

Figure 27:
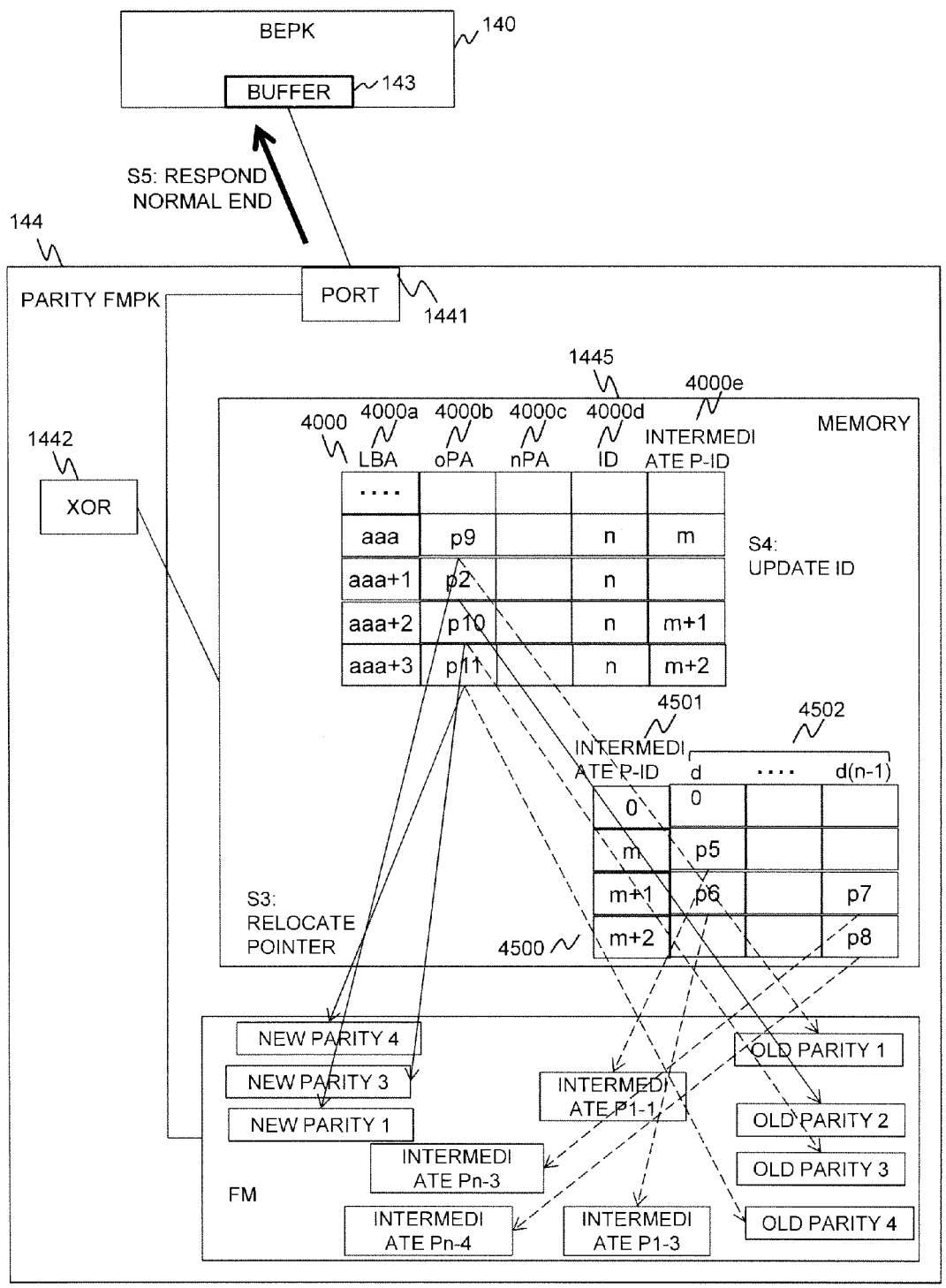
FIG. 27 is a (fourth) view showing the change of state within the FMPK when the parity FMPK receives a new data commitment command.

FIG. 27 illustrates a state where the old parities 1, 3 and 4 mapped to "aaa", "aaa+2" and "aaa+3" of the access target LBAs are replaced with new parities 1, 3 and 4 generated by the current new data commitment command. Before reception of the new data commitment command, oPA 4000*c* of the rows where the LBA 4000*a* are "aaa", "aaa+2" and "aaa+3" in the logical address management information 4000 store physical addresses p0, p3 and p4, and old parities 1, 3 and 4 have been mapped to LBA "aaa", "aaa+2" and "aaa+3", but in response to reception of the new data commitment command, the values of oPA 4000*c* are replaced with p9, p10 and p11, which are physical addresses of the generated new parities 1, 3 and 4. As described, according to the FMPK 144 of the present embodiment, the multiple parities before update located on discontinuous areas can be updated (parity after update can be generated and stored) merely by issuing a single command from the controller 100 which is the command transmission source. For example, as shown in the examples of FIGS. 24 through 27, in order to update multiple parities before update, there may occur a case where the method for generating parities after update differ, such as when parity after update of a parity of a certain area (such as LBA "aaa") can be generated using a single intermediate parity (and the parity before update), while the parity after update of a parity of a different area (such as LBA "aaa+3") is generated using two intermediate parities (and parity before update). In the FMPK 144 according to the present embodiment, multiple parities before update can be updated merely by issuing a single command.

The above description has illustrated the storage system and the FMPK according to the preferred embodiment of the present invention. According to the storage system of the present embodiment, even when multiple data must be stored in discontinuous areas within the volume as a result of receiving multiple write requests from the host computer to the volume, only one command should be issued from the storage controller when storing these multiple data in the storage media (FMPK).

In the prior art, in order to generate a RAID parity, if multiple data after update are written discontinuously in the data stripes, a write command for update data, a read command for intermediate parity, and a data commitment command had to be issued for each small area storing data continuously in the data stripes. However, according to the storage system of the present embodiment, even when multiple data are written discontinuously in the data stripes, the new data transmission command, the intermediate parity reception command and the new data commitment command should only be issued once per each storage media storing the data stripes, and the new data transmission command, the intermediate parity reception command and the new data commitment command should also only be issued once per storage media storing parity stripes, so that the process load of the storage controller can be reduced significantly.

The present embodiment has been described above, but the embodiment is a mere example for describing the present invention, and it is not intended to restrict the scope of the present invention to the above-illustrated embodiment. The present invention can be implemented in various other forms. For example, according to the storage system 10 illustrated in the embodiment, the respective components are mounted in the form of package boards, but they are not restricted to such form. The present invention can also be implemented in a configuration that does not adopt a design where multiple respective types of package boards are mounted.

According further to the storage system 10 of the present embodiment, a configuration has been illustrated where the final storage media storing the write data from the host computer is the FMPK, which is a storage device utilizing flash memories, but the final storage media is not restricted to the storage device using flash memories. For example, it can be a storage device adopting nonvolatile memories such as a Phase Change RAM or a Resistance RAM. Further, the present invention can be implemented by using magnetic disk devices such as HDDs (Hard Disk Drives).

In the description of the preferred embodiment of the present invention, an example has been mainly illustrated where the RAID group constituted in the storage system 10 of the present embodiment is a RAID level 5, but even if the RAID level of the RAID group is of other RAID levels (such as RAID3 or RAID6), the present invention can be adopted. Further according to the embodiment of the present invention, in the storage system 10 of the present embodiment, it was assumed that a storage area of a single RAID group is mapped to a single logical volume, but the present invention is not restricted to such configuration. For example, it is possible to divide a storage area of one RAID group into two or more continuous areas, and to adopt a configuration where each continuous area having been divided is mapped to one logical volume. On the other hand, it is possible to adopt a configuration where a single logical volume is mapped to multiple RAID groups.

Further, in the description of the preferred embodiment of the present invention, the storage area of the logical volume provided to the host computer and the storage area of the RAID group are assumed to be mapped (associated) in a fixed manner, but the present invention is not restricted to a configuration where the relationship between the storage area of the logical volume and the storage area of the RAID group is fixed. For example, it is possible to adopt a configuration where logical volumes are defined using a thin-provisioning technique, which is a well-known art, and having the storage area of the RAID group allocated to the storage area only when a write request has been received from the host computer to the storage area in the logical volume.

The components illustrated as programs in the embodiment can also be realized via a hardware using hardwired logic and the like. Further, it is possible to adopt a form where the various programs in the embodiment is provided by storing in storage media such as CD-ROMs and DVDs.

REFERENCE SIGNS LIST

1: SAN
10: Storage system
20: Management computer
30: Host computer
100: Controller (Storage controller)
110: FEPK
111: FE I/F
112: Transfer circuit
113: Buffer
120: MPPK
121: MP
122: LM
123: Internal bus
130: CMPK
131: CM
132: SM
140: BEPK
141: BE I/F
142: Transfer circuit
143: Buffer
144: FMPK
145: RAID group
200: Storage unit
1441: Port
1442: Logical operation circuit
1443: FM
1444: CPU
1445: Memory

The invention claimed is:

1. A storage system comprising a controller having one or more processors, and multiple storage devices having storage media, the multiple storage devices constituting a RAID group, wherein
the RAID group is configured to store a parity calculated from data stored within a given range of n number of storage devices constituting the RAID group to the given range of one of said storage devices constituting the RAID group;
when multiple write data is stored in a first storage device of the n number of storage devices, the processor is configured to:
transmit to the first storage device a new data transmission command containing information capable of specifying multiple areas within the given range in the first storage device, and the multiple write data;
receive multiple first intermediate parities generated from the multiple write data and data before update of the multiple write data from the first storage device;
transmit an intermediate parity transmission command containing information capable of specifying the multiple areas, and the multiple first intermediate parities, to a storage device storing the parity corresponding to the multiple write data;
transmit a data commitment command containing information capable of specifying the multiple areas to the multiple storage devices; and
when the storage device storing the parity receives the data commitment command, it is configured to generate a parity after update based on the first intermediate parity and the parity before update stored in multiple areas of the storage device storing the parity.

2. The storage system according to claim 1, wherein
before transmitting the data commitment command to a storage device storing the parity;
after transmitting a new data transmission command containing information capable of specifying one or more areas within the given range, and one or more second write data stored in the one or more areas to a second storage device of the n number of storage devices, the processor is configured to:
receive one or more second intermediate parities generated from the one or more second write data and a data before update of the one or more second write data;
transmit an intermediate parity transmission command containing information capable of specifying the one or more areas, and the one or more second intermediate parity to a storage device storing the parity; and
when the storage device storing the parity receives the data commitment command, it is configured to generate a parity after update by the transmitted first intermediate parity, the second intermediate parity and the parity before update.

3. The storage system according to claim 2, wherein the processor includes a common identifier to a new data transmission command containing information capable of specifying the area, an intermediate parity transmission command containing information capable of specifying the area, and the data commitment command, and is configured to transmit the same to the multiple storage devices.

4. The storage system according to claim 2, wherein when the processor transmits the intermediate parity transmission command to a storage device storing the parity,
when transmitting the first intermediate parity received from the first storage device, it is configured to create and transmit the intermediate parity transmission command containing a first row number;
when transmitting the second intermediate parity received from the second storage device, it is configured to create the intermediate parity transmission command containing a second row number that differs from the first row number; and
when the storage device storing the parity receives the intermediate parity transmission command containing the first row number and the intermediate parity transmission command containing the second row number, it is configured to map both the first intermediate parity and the second intermediate parity to the area contained in the intermediate parity transmission command, and store the same.

5. The storage system according to claim 2, wherein the information capable of specifying multiple areas within the given range is composed of an address within the storage device, a data transmission length, and a bitmap;
each bit of the bitmap shows whether or not each area within the range specified by the address and the data transmission length is a data transmission target area or not; and
the processor is configured to:
designate a logical sum of a first bitmap designated when transmitting the intermediate parity transmission command to the first storage device and a second bitmap designated when transmitting the intermediate parity transmission command to the second storage device as a bitmap for transmitting the data commitment command to the storage device storing the parity.

6. The storage system according to claim 2, wherein the storage device storing the parity is configured to map the intermediate parity to the area contained in the intermediate parity transmission command and store the same every time it receives the intermediate parity transmission command and the intermediate parity; and
when the storage device storing the parity receives the data commitment command containing information capable of specifying the multiple areas, when multiple intermediate parities are mapped to each of the multiple areas, a parity after update is generated based on the multiple intermediate parities and a parity before update stored in the area.

7. The storage system according to claim 1, wherein when the processor receives the multiple intermediate parities, it is configured to transmit an intermediate parity reception command containing information capable of specifying the multiple areas to the first storage device; and
in response to receiving the intermediate parity reception command, the first storage device is configured to generate multiple intermediate parities by generating an exclusive OR of the multiple write data and the data before update of the multiple write data, and returning the multiple intermediate parities to the processor.

8. The storage system according to claim 1, wherein the storage system is composed to enable to set from an exterior whether to generate the parity in the storage device or in the controller; and
when storing the write data in the storage device, the processor is configured to generate a parity in the controller when the parity is set to be generated in the controller.

9. The storage system according to claim 1, wherein the storage media is a flash memory.

10. A storage device comprising one or more storage media and a controller: wherein
for each logical area in a logical address space provided by the storage device, the controller is configured to map a first address within the storage media storing data of the logical area to a second address of a new area storing data for update of the logical area, and manage the same;
when the controller receives a new data transmission command containing information for specifying multiple said logical areas arranged discontinuously in the logical address space and update data of the multiple logical areas from an external device connected to the controller,
the controller is configured to:
store update data of the multiple logical areas in the storage media; and
map an address within the storage media storing the update data as the second address for each of the multiple logical areas specified by the information for specifying the multiple logical areas;
when the controller receives a read command for reading data of the logical area from the external device, it is configured to read the data from a first address within the storage media storing data of the logical area, and sends the same to the external device; and
when the controller receives an intermediate parity reception command containing information for specifying the multiple logical areas arranged discontinuously in the logical address space from the external device,
the controller is configured to calculate an exclusive OR of data read from the first address and the second address mapped to each of the multiple logical areas, and return the computed exclusive OR to the external device,
wherein the controller is composed to map multiple third addresses within the storage media storing an intermediate parity for generating a parity after update of data of the logical area to each logical area in a logical address space provided by the storage device; and when the controller receives information for specifying multiple logical areas arranged discontinuously in the logical address space, an intermediate parity transmission command containing row number k, and the multiple intermediate parities corresponding to the multiple logical areas from the external device, the controller is configured to store the multiple intermediate parities in the storage media; and map an address in the storage media storing the intermediate parity corresponding to the logical area as a k-th third address for each of the logical areas.

11. The storage device according to claim 10, wherein when the controller receives a data commitment command containing information for specifying the multiple logical areas arranged discontinuously in the logical address space from the external device:

regarding each of the multiple logical areas;

the controller maps the second address as the first address to the logical area, when the second address is mapped;

when one or more third addresses are mapped;

the controller generates a parity after update from data read from the first address and one or more intermediate parities read from the one or more third addresses, and stores the same in the storage media; and maps an address in the storage media storing the parity after update as the first address to the logical area.

* * * * *